United States Patent
Carlson et al.

(10) Patent No.: US 8,396,455 B2
(45) Date of Patent: Mar. 12, 2013

(54) SYSTEMS AND METHODS FOR SORTING ALERT AND OFFER MESSAGES ON A MOBILE DEVICE

(75) Inventors: Mark Carlson, Half Moon Bay, CA (US); Dan Bebenita, San Ramon, CA (US); Surendra Keshan, Cupertino, CA (US); Patrick Stan, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 565 days.

(21) Appl. No.: 12/565,627

(22) Filed: Sep. 23, 2009

(65) Prior Publication Data

US 2010/0075638 A1 Mar. 25, 2010

Related U.S. Application Data

(60) Provisional application No. 61/100,205, filed on Sep. 25, 2008.

(51) Int. Cl.
*H04M 1/725* (2006.01)

(52) U.S. Cl. .............. 455/412.2; 455/412.1; 455/466; 455/406; 455/558; 705/26.4

(58) Field of Classification Search .............. 455/466, 455/412.1–412.2, 558, 405–408; 705/26.4
See application file for complete search history.

(56) References Cited

U.S. PATENT DOCUMENTS

| | | | |
|---|---|---|---|
| 4,528,442 A | 7/1985 | Endo | |
| 4,613,904 A | 9/1986 | Lurie | |
| 5,311,594 A | 5/1994 | Penzias | |
| 5,420,926 A | 5/1995 | Low et al. | |
| 5,448,471 A | 9/1995 | Deaton et al. | |
| 5,483,444 A | 1/1996 | Heintzeman et al. | |
| 5,502,636 A | 3/1996 | Clarke | |
| 5,513,250 A | 4/1996 | McAllister | |
| 5,530,438 A | 6/1996 | Bickham et al. | |
| 5,592,560 A | 1/1997 | Deaton et al. | |
| 5,604,921 A | 2/1997 | Alanara | |
| 5,615,110 A | 3/1997 | Wong | |
| 5,627,549 A | 5/1997 | Park | |
| 5,642,485 A | 6/1997 | Deaton et al. | |
| 5,679,938 A | 10/1997 | Templeton et al. | |
| 5,679,940 A | 10/1997 | Templeton et al. | |
| 5,689,100 A | 11/1997 | Carrithers et al. | |

(Continued)

FOREIGN PATENT DOCUMENTS

| | | |
|---|---|---|
| AU | 2005279689 | 3/2006 |
| KR | 10-2006-0013911 A | 2/2006 |

(Continued)

OTHER PUBLICATIONS

U.S. Appl. No. 60/335,667, filed Feb. 5, 2002.

(Continued)

*Primary Examiner* — Sharad Rampuria
(74) *Attorney, Agent, or Firm* — Kilpatrick Townsend & Stockton LLP

(57) ABSTRACT

A method and system are presented for sorting alert and offer messages on a mobile device. One embodiment of the invention is directed to a method including receiving alert messages at a mobile device where each alert message contains transaction data associated with a transaction conducted with a merchant. Upon receiving the alert messages, the mobile device receives alert message sorting criteria from a user associated with the mobile device, sorts the alert messages according to the received offer sorting criteria, and displays the sorted alert messages.

18 Claims, 14 Drawing Sheets

U.S. PATENT DOCUMENTS

| | | |
|---|---|---|
| 5,708,422 A | 1/1998 | Blonder et al. |
| 5,717,866 A | 2/1998 | Naftzger |
| 5,774,525 A | 6/1998 | Kanevsky et al. |
| 5,774,882 A | 6/1998 | Keen et al. |
| 5,852,775 A | 12/1998 | Hidary |
| 5,870,030 A | 2/1999 | DeLuca et al. |
| 5,872,834 A | 2/1999 | Teitelbaum |
| 5,878,337 A | 3/1999 | Joao et al. |
| 5,884,277 A | 3/1999 | Khosla |
| 5,903,830 A | 5/1999 | Joao et al. |
| 5,903,878 A | 5/1999 | Talati et al. |
| 5,914,472 A | 6/1999 | Foladare et al. |
| 5,924,080 A | 7/1999 | Johnson |
| 5,956,695 A | 9/1999 | Carrithers et al. |
| 5,959,577 A | 9/1999 | Fan et al. |
| 5,988,497 A | 11/1999 | Wallace |
| 5,991,750 A | 11/1999 | Watson |
| 5,999,914 A | 12/1999 | Blin et al. |
| 6,003,326 A | 12/1999 | Hensley |
| 6,012,144 A | 1/2000 | Pickett |
| 6,014,634 A | 1/2000 | Scroggie et al. |
| 6,052,675 A | 4/2000 | Checchio |
| 6,055,505 A | 4/2000 | Elston |
| 6,055,570 A | 4/2000 | Nielsen |
| 6,062,991 A | 5/2000 | Moriarty et al. |
| 6,064,990 A | 5/2000 | Goldsmith |
| 6,067,529 A | 5/2000 | Ray et al. |
| 6,081,792 A | 6/2000 | Cucinotta et al. |
| 6,095,413 A | 8/2000 | Tetro et al. |
| 6,122,624 A | 9/2000 | Tetro et al. |
| 6,185,200 B1 | 2/2001 | Prasad |
| 6,185,290 B1 | 2/2001 | Shaffer et al. |
| 6,185,541 B1 | 2/2001 | Scroggie et al. |
| 6,195,542 B1 | 2/2001 | Griffith |
| 6,219,793 B1 | 4/2001 | Li et al. |
| 6,263,447 B1 | 7/2001 | French et al. |
| 6,279,112 B1 | 8/2001 | O'Toole, Jr. et al. |
| 6,292,786 B1 | 9/2001 | Deaton et al. |
| 6,311,169 B2 | 10/2001 | Duhon |
| 6,317,718 B1 | 11/2001 | Fano |
| 6,318,631 B1 | 11/2001 | Halperin |
| 6,330,550 B1 | 12/2001 | Brisebois et al. |
| 6,336,098 B1 | 1/2002 | Fortenberry et al. |
| 6,336,099 B1 | 1/2002 | Barnett et al. |
| 6,353,398 B1 | 3/2002 | Amin et al. |
| 6,381,324 B1 | 4/2002 | Shaffer et al. |
| 6,409,778 B1 | 6/2002 | Auschra et al. |
| 6,418,436 B1 | 7/2002 | Degen et al. |
| 6,424,949 B1 | 7/2002 | Deaton et al. |
| 6,424,951 B1 | 7/2002 | Shurling et al. |
| 6,442,532 B1 | 8/2002 | Kawan |
| 6,470,181 B1 | 10/2002 | Maxwell |
| 6,484,146 B2 | 11/2002 | Day et al. |
| 6,484,148 B1 | 11/2002 | Boyd |
| 6,488,206 B1 | 12/2002 | Flaig et al. |
| 6,496,936 B1 | 12/2002 | French et al. |
| 6,505,046 B1 | 1/2003 | Baker |
| 6,529,725 B1 | 3/2003 | Joao et al. |
| 6,535,855 B1 | 3/2003 | Cahill et al. |
| 6,553,100 B1 | 4/2003 | Chen et al. |
| 6,571,279 B1 | 5/2003 | Herz et al. |
| 6,587,835 B1 | 7/2003 | Treyz et al. |
| 6,608,556 B2 | 8/2003 | De Moerloose et al. |
| 6,612,488 B2 | 9/2003 | Suzuki |
| 6,636,587 B1 | 10/2003 | Nagai et al. |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,715,672 B1 | 4/2004 | Tetro et al. |
| 6,736,322 B2 | 5/2004 | Gobburu et al. |
| 6,741,188 B1 | 5/2004 | Miller et al. |
| RE38,572 E | 8/2004 | Tetro et al. |
| 6,775,539 B2 | 8/2004 | Deshpande |
| 6,813,606 B2 | 11/2004 | Veyama et al. |
| 6,823,318 B1 | 11/2004 | Creswell et al. |
| 6,832,721 B2 | 12/2004 | Fujii |
| 6,842,774 B1 | 1/2005 | Piccioni |
| 6,857,073 B2 | 2/2005 | French et al. |
| 6,859,451 B1 | 2/2005 | Pasternack |
| 6,862,575 B1 | 3/2005 | Anttila et al. |
| 6,868,391 B1 | 3/2005 | Hultgren |
| 6,873,972 B1 | 3/2005 | Murcial et al. |
| 6,877,661 B2 | 4/2005 | Webb et al. |
| 6,879,838 B2 | 4/2005 | Rankin et al. |
| 6,891,911 B2 | 5/2005 | Rostoker et al. |
| 6,912,398 B1 | 6/2005 | Domnitz |
| 6,913,194 B2 | 7/2005 | Suzuki |
| 6,948,656 B2 | 9/2005 | Williams |
| 6,968,180 B2 | 11/2005 | Kirby et al. |
| 6,970,850 B1 | 11/2005 | Freeny, Jr. |
| 6,988,657 B1 | 1/2006 | Singer et al. |
| 6,993,326 B2 | 1/2006 | Link, II et al. |
| 7,003,497 B2 | 2/2006 | Maes |
| 7,013,286 B1 | 3/2006 | Aggarwal et al. |
| 7,014,107 B2 | 3/2006 | Singer et al. |
| 7,024,211 B1 | 4/2006 | Martin |
| 7,024,396 B2 | 4/2006 | Woodward |
| 7,025,256 B1 | 4/2006 | Drummond et al. |
| 7,027,801 B1 | 4/2006 | Hall et al. |
| 7,028,052 B2 | 4/2006 | Chapman et al. |
| 7,028,906 B2 | 4/2006 | Challa et al. |
| 7,040,533 B1 | 5/2006 | Ramachandran |
| 7,058,611 B2 | 6/2006 | Kranzley et al. |
| 7,092,724 B2 | 8/2006 | Fellenstein et al. |
| 7,096,003 B2 | 8/2006 | Joao et al. |
| 7,100,049 B2 | 8/2006 | Gasparini et al. |
| 7,100,821 B2 | 9/2006 | Rasti |
| 7,107,250 B2 | 9/2006 | Harrison |
| 7,136,841 B2 | 11/2006 | Cook |
| 7,150,393 B1 | 12/2006 | Drummond et al. |
| 7,152,788 B2 | 12/2006 | Williams |
| 7,167,711 B1 | 1/2007 | Dennis |
| 7,167,830 B2 | 1/2007 | Sravanapudi et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,225,156 B2 | 5/2007 | Fisher et al. |
| 7,231,657 B2 | 6/2007 | Honarvar et al. |
| 7,251,624 B1 | 7/2007 | Lee et al. |
| 7,257,545 B1 | 8/2007 | Hung |
| 7,264,154 B2 | 9/2007 | Harris |
| 7,292,996 B2 | 11/2007 | Nobrega et al. |
| 7,310,534 B2 | 12/2007 | Northcutt |
| 7,337,119 B1 | 2/2008 | Geschewender et al. |
| 7,343,149 B2 * | 3/2008 | Benco et al. ............... 455/406 |
| 7,343,317 B2 | 3/2008 | Jokinen et al. |
| 7,349,668 B2 | 3/2008 | Ilan et al. |
| 7,355,990 B2 | 4/2008 | Smith |
| 7,356,506 B2 | 4/2008 | Watson |
| 7,357,310 B2 | 4/2008 | Calabrese et al. |
| 7,376,431 B2 | 5/2008 | Niedermeyer |
| 7,418,086 B2 | 8/2008 | Sravanapudi et al. |
| 7,581,221 B2 | 8/2009 | Lai et al. |
| 7,653,573 B2 * | 1/2010 | Hayes et al. ............. 705/26.43 |
| 7,831,246 B1 * | 11/2010 | Smith et al. ................ 455/420 |
| 7,957,751 B2 * | 6/2011 | Cone ........................ 455/456.2 |
| 8,116,730 B2 * | 2/2012 | Smith ......................... 455/408 |
| 8,140,096 B2 * | 3/2012 | Cunningham et al. ........ 455/466 |
| 8,160,934 B2 * | 4/2012 | Carlson et al. ............. 705/26.4 |
| 8,170,527 B2 * | 5/2012 | Granucci et al. ............ 455/406 |
| 2001/0011245 A1 | 8/2001 | Duhon |
| 2001/0029485 A1 | 10/2001 | Brody et al. |
| 2001/0049636 A1 | 12/2001 | Hudda et al. |
| 2002/0077964 A1 | 6/2002 | Brody et al. |
| 2002/0087460 A1 | 7/2002 | Hornung |
| 2002/0091569 A1 | 7/2002 | Kitaura et al. |
| 2002/0091945 A1 | 7/2002 | Ross |
| 2002/0102993 A1 | 8/2002 | Hendrey et al. |
| 2002/0107027 A1 | 8/2002 | O'Neil |
| 2002/0108062 A1 | 8/2002 | Nakajima et al. |
| 2002/0111852 A1 | 8/2002 | Levine |
| 2002/0116322 A1 | 8/2002 | Schnall |
| 2002/0133462 A1 | 9/2002 | Shteyn |
| 2002/0140542 A1 | 10/2002 | Prokoski et al. |
| 2002/0156677 A1 | 10/2002 | Peters et al. |

| | | |
|---|---|---|
| 2002/0160817 A1* | 10/2002 | Salmimaa et al. ............ 455/566 |
| 2002/0169713 A1 | 11/2002 | Chang et al. |
| 2002/0198777 A1 | 12/2002 | Yuasa |
| 2003/0006911 A1 | 1/2003 | Smith et al. |
| 2003/0058261 A1 | 3/2003 | Challa et al. |
| 2003/0061163 A1 | 3/2003 | Durfield |
| 2003/0061211 A1 | 3/2003 | Shultz et al. |
| 2003/0105707 A1 | 6/2003 | Audebert et al. |
| 2003/0126095 A1 | 7/2003 | Allen |
| 2003/0135463 A1 | 7/2003 | Brown et al. |
| 2003/0154126 A1 | 8/2003 | Gehlot et al. |
| 2003/0163359 A1 | 8/2003 | Kanesaka |
| 2003/0182191 A1 | 9/2003 | Oliver et al. |
| 2003/0201500 A1 | 10/2003 | Furukawa et al. |
| 2003/0208684 A1 | 11/2003 | Camacho et al. |
| 2003/0222134 A1 | 12/2003 | Boyd |
| 2004/0024638 A1 | 2/2004 | Restis |
| 2004/0039683 A1 | 2/2004 | McGeorge |
| 2004/0039691 A1 | 2/2004 | Barratt et al. |
| 2004/0054575 A1 | 3/2004 | Marshall |
| 2004/0064401 A1 | 4/2004 | Palaghita |
| 2004/0064403 A1 | 4/2004 | Hasumi et al. |
| 2004/0078340 A1 | 4/2004 | Evans |
| 2004/0093274 A1 | 5/2004 | Vanska et al. |
| 2004/0103049 A1 | 5/2004 | Kerr |
| 2004/0117254 A1 | 6/2004 | Nemirofsky et al. |
| 2004/0148253 A1 | 7/2004 | Shin et al. |
| 2004/0199470 A1 | 10/2004 | Ferry et al. |
| 2004/0254848 A1 | 12/2004 | Golan et al. |
| 2005/0080716 A1 | 4/2005 | Belyi et al. |
| 2005/0091118 A1 | 4/2005 | Fano |
| 2005/0154665 A1 | 7/2005 | Kerr |
| 2005/0165684 A1 | 7/2005 | Jenson et al. |
| 2005/0170814 A1 | 8/2005 | Joao et al. |
| 2005/0199775 A1 | 9/2005 | Kaminski et al. |
| 2005/0216337 A1 | 9/2005 | Roberts et al. |
| 2005/0228719 A1 | 10/2005 | Roberts et al. |
| 2006/0004631 A1 | 1/2006 | Roberts et al. |
| 2006/0010231 A1 | 1/2006 | Spector |
| 2006/0043473 A1 | 3/2006 | Eppich |
| 2006/0043474 A1 | 3/2006 | Kinzer et al. |
| 2006/0059110 A1 | 3/2006 | Madhok et al. |
| 2006/0074769 A1 | 4/2006 | Looney et al. |
| 2006/0085260 A1 | 4/2006 | Yamagishi |
| 2006/0089905 A1 | 4/2006 | Song et al. |
| 2006/0111967 A1 | 5/2006 | Firbes |
| 2006/0131385 A1 | 6/2006 | Kim |
| 2006/0136546 A1 | 6/2006 | Trioano et al. |
| 2006/0161435 A1 | 7/2006 | Atef et al. |
| 2006/0161599 A1 | 7/2006 | Rosen |
| 2006/0165060 A1 | 7/2006 | Dua |
| 2006/0200396 A1 | 9/2006 | Satterfield et al. |
| 2006/0202025 A1 | 9/2006 | Calabrese et al. |
| 2006/0253389 A1 | 11/2006 | Hagale et al. |
| 2006/0277142 A1 | 12/2006 | McGeorge |
| 2006/0281439 A1 | 12/2006 | Benco et al. |
| 2007/0006286 A1 | 1/2007 | Singhal |
| 2007/0011099 A1 | 1/2007 | Sheehan |
| 2007/0034682 A1 | 2/2007 | Williams |
| 2007/0050259 A1 | 3/2007 | Wesley |
| 2007/0094150 A1 | 4/2007 | Yven et al. |
| 2007/0107044 A1 | 5/2007 | Yven et al. |
| 2007/0136131 A1 | 6/2007 | Mankoff |
| 2007/0155402 A1 | 7/2007 | Van Erlach |
| 2007/0162328 A1 | 7/2007 | Reich |
| 2007/0174259 A1 | 7/2007 | Amjadi |
| 2007/0178912 A1 | 8/2007 | Baranowski |
| 2007/0185776 A1 | 8/2007 | Nguyen et al. |
| 2007/0226051 A1 | 9/2007 | Addepalli et al. |
| 2007/0250380 A1 | 10/2007 | Mankoff |
| 2007/0262136 A1 | 11/2007 | Ou |
| 2007/0288641 A1 | 12/2007 | Lee et al. |
| 2008/0000964 A1 | 1/2008 | Flake et al. |
| 2008/0004950 A1 | 1/2008 | Huang et al. |
| 2008/0052168 A1 | 2/2008 | Peters et al. |
| 2008/0059297 A1 | 3/2008 | Vallier et al. |
| 2008/0139112 A1 | 6/2008 | Sampath et al. |
| 2008/0139181 A1 | 6/2008 | Lokshin |
| 2008/0147484 A1 | 6/2008 | Davis |
| 2008/0147495 A1 | 6/2008 | Bal et al. |
| 2008/0156869 A1 | 7/2008 | Carr et al. |
| 2008/0156870 A1 | 7/2008 | Niedermeyer et al. |
| 2008/0161018 A1 | 7/2008 | Miller et al. |
| 2008/0163257 A1 | 7/2008 | Carlson et al. |
| 2008/0167017 A1* | 7/2008 | Wentker et al. ............ 455/414.1 |
| 2008/0167990 A1 | 7/2008 | Grant |
| 2008/0167991 A1 | 7/2008 | Carlson et al. |
| 2008/0182590 A1 | 7/2008 | Ruckart et al. |
| 2008/0183480 A1 | 7/2008 | Carlson et al. |
| 2008/0200144 A1 | 8/2008 | Ginsberg |
| 2008/0201310 A1 | 8/2008 | Fitzpatrick et al. |
| 2008/0201321 A1 | 8/2008 | Fitzpatrick et al. |
| 2008/0288385 A1 | 11/2008 | Geschwender et al. |
| 2009/0106846 A1 | 4/2009 | Dupray et al. |
| 2010/0268630 A1* | 10/2010 | Holmen ..................... 705/35 |
| 2012/0066096 A1* | 3/2012 | Penide ..................... 705/27.1 |

FOREIGN PATENT DOCUMENTS

| | | |
|---|---|---|
| WO | WO 97/45814 A1 | 4/1997 |
| WO | WO 99/51038 A2 | 10/1999 |
| WO | WO 00/03328 A1 | 1/2000 |
| WO | WO 2007/056449 A2 | 5/2007 |
| WO | WO 2007/056450 A2 | 5/2007 |

OTHER PUBLICATIONS

U.S. Appl. No. 60/356,861, filed Feb. 12, 2002.
U.S. Appl. No. 60/361,646, filed Mar. 4, 2002.
U.S. Appl. No. 12/491,139, filed Jun. 24, 2009.
U.S. Appl. No. 12/491,125, filed Jun. 24, 2009.
Wolf, Jim; "New Web Service Warns of Identity Theft;" www.greenspun.com/bboard/q-and-a-fetch-msg.tcl?msg_id=003yBJ; Oct. 23, 2000; printed May 4, 2011; 2 pages.
International Search Report of the International Searching Authority for Application No. PCT/US2009/057969, mailed on Apr. 14, 2010, 7 pages.
Written Opinion of the International Searching Authority for Application No. PCT/US2009/057969, mailed on Apr. 14, 2010, 4 pages.

* cited by examiner

SYSTEMS AND METHODS FOR SORTING ALERT AND OFFER MESSAGES ON A MOBILE DEVICE

CROSS-REFERENCES TO RELATED APPLICATIONS

The present application is a non-provisional application of and claims priority to U.S. Provisional Application No. 61/100,205, filed on Sep. 25, 2008, the entire contents of which are herein incorporated by reference for all purposes.

BACKGROUND

Transaction alert and offer messages that are sent to a mobile device are displayed on the mobile device according to the date they were sent to or received by the mobile device. As the mobile device receives more and more of such transaction alert and offer messages, a consumer's mobile device can be filled with such transaction alert and offer messages making it very difficult for the consumer to manage them. In the case of offers, the sheer numbers of offers received at a mobile device may cause the consumer to potentially miss using a relevant offer before the expiration date of the offer. In the case of transaction alerts, the sheer number of alerts messages received may cause the consumer to delete such alert messages as they come in. The consumer may consequently be unable to keep track of such alert messages for later recordkeeping.

Embodiments of the invention address these and other problems individually and collectively.

BRIEF SUMMARY

Embodiments of the invention are directed to alert and offer sorting systems and methods. In particular, a method for sorting alert and offer messages on a mobile device according to sorting criteria from a consumer associated with the mobile device.

One embodiment of the invention is directed to a mobile device having a processor, a display coupled to the processor, and a computer readable medium coupled to the processor, where the processor is configured to execute a set of instructions stored on the storage medium to enable the processor to perform the actions of: receiving alert messages where each alert message contains transaction data associated with a transaction conducted with a merchant, upon receiving the alert messages, receiving alert message sorting criteria from a user associated with the mobile device, sorting the alert messages according to the received alert sorting criteria, and displaying the sorted alert messages using the display.

Another embodiment of the invention is directed to a method comprising receiving alert messages on a mobile device where each alert message contains transaction data associated with a transaction conducted with a merchant. Upon receiving the alert messages, receiving alert message sorting criteria from a user associated with the mobile device, sorting the alert messages according to the received offer sorting criteria, and displaying the sorted alert messages.

In a specific example, multiple alert messages associated with transactions conducted with various merchants (e.g., Stores 1-30) for various amounts (ranging from 1 USD to 500 USD) are sent to a mobile phone operated by a consumer over the course of one month. These alert messages are displayed on the mobile phone according to the date the alerts were sent to the mobile phone. The consumer decides he wants to be more conscious about his spending habits and wants to identify, on his mobile phone, all transactions involving purchases of more than 200 USD made within the past month. By identifying such purchases, the consumer feels that he can decide whether such transactions were necessary. The conventional display of alert messages would require the consumer to scroll through these messages (on his mobile phone) and individually identify those transactions that fit his criteria. However, if this mobile phone were to contain an option to sort the alert messages according to criteria such as transaction amount, the consumer could simply set his criteria to display all alert messages that involve transactions over 200 USD and such messages would be displayed. This would save the consumer time by quickly giving the consumer access to those alert messages that are of interest to him.

Other embodiments of the invention are described in further detail below. Other embodiments of the invention may relate to specific types of alerts and/or offers and the functionality corresponding to such alerts and offers.

DETAILED DESCRIPTION

Figure 1:
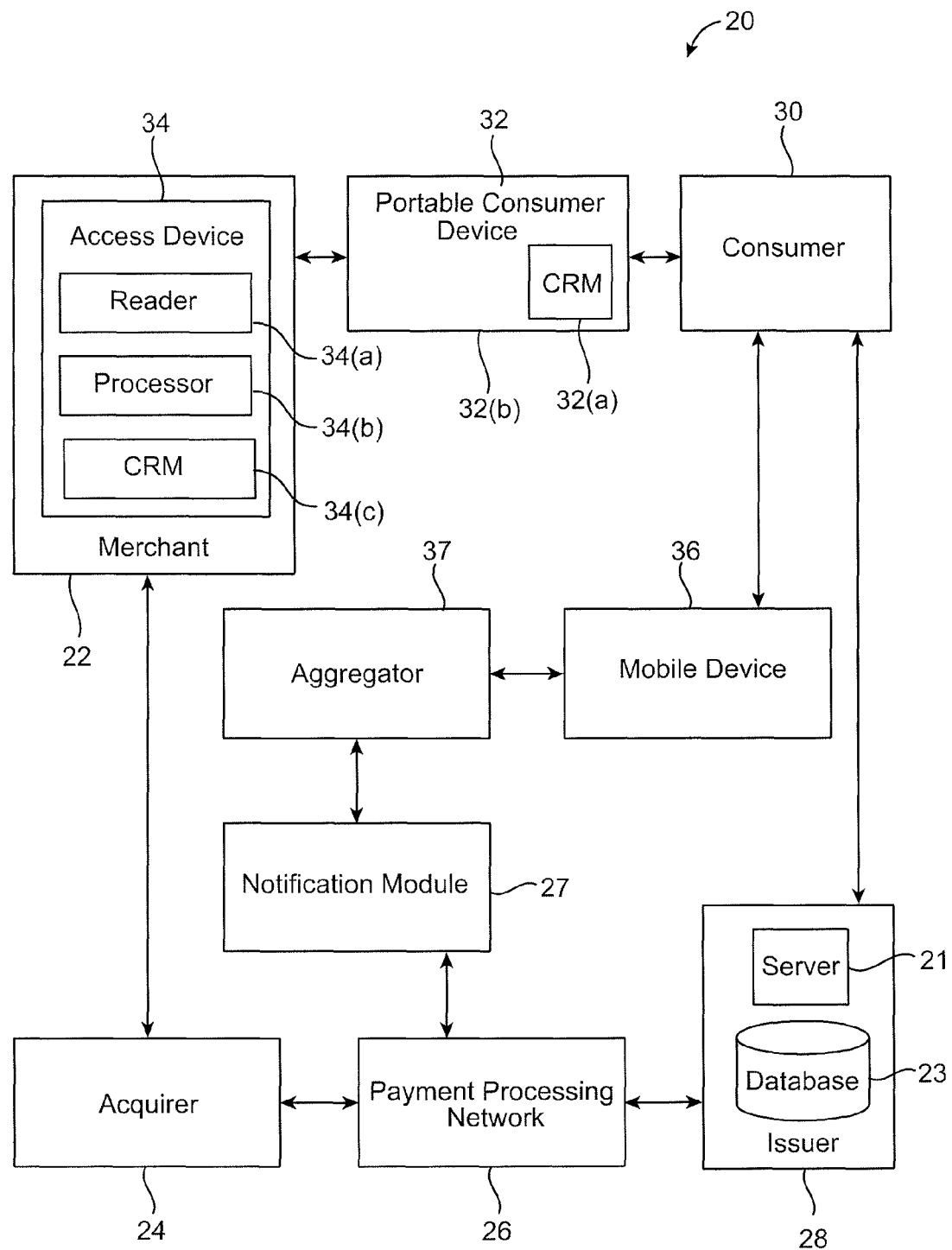
FIG. 1 is a block diagram of a payment processing system according to an embodiment of the invention.

Embodiments of the invention are directed to a method of displaying, on a mobile device, sorted alert and offer messages according to sorting criteria from a user associated with the mobile device.

The mobile device receives alert messages that contain transaction data associated with a transaction conducted with a merchant. Alert messages are notifications containing transaction data that are sent to a mobile device to help a consumer manage and track transactions. These alert messages may be near-real-time notifications and may include various information such as transaction type (e.g., general/standard payment, mail-order telephone-order, cross-border), transaction amount, date and time the transaction occurred, location, city and state in which the transaction occurred, merchant name and location (if available), issuer (by name, personal access number and/or issuer-defined footer), information about how to contact the issuer (e.g., phone number, online/mobile website, which is actionable via launching a browser or the like upon selecting/touching such information), issuer logo, information on how to contact service administrator, currency code, currency symbol, alphanumeric code, and bar code.

In embodiments of the invention, the user typically downloads and installs a payment application on the mobile device, enrolls in a service, and registers the mobile device to view and receive notification (alert and offer) messages. The user may thereafter launch the application to view and receive the notification messages and such messages are sent by any suitable entity in any suitable manner.

The mobile device receives alert message sorting criteria from a user associated with the mobile device. The user of the mobile device has the option of selecting criteria which he wishes the alert messages to be sorted by. The mobile device may offer the user a drop down menu of different categories to sort the alert messages by.

Using instructions on a computer readable medium, a processor in the mobile device sorts the alert messages according to the received criteria from the user associated with the mobile device. The alert messages may be sorted by any number of ways such as transaction type (e.g., general/standard payment, mail-order telephone-order, cross-border), transaction amount, issuer, type of card, and the date the alert messages were received by the mobile device.

After the processor sorts the alert messages, instructions on the computer readable medium in the mobile device causes a processor to display the sorted messages.

The systems and methods as described herein may be used in the context of payment transactions using payment processing systems, which are configured to process credit and debit card transactions. Further, embodiments of the invention are directed to the use of mobile devices, and methods and systems that use them. The mobile device may be used in payment processing systems as shown in FIG. 1.

I. Systems and Methods for Sorting Alert and Offer Messages on a Mobile Device

FIG. 1 is a system 20 that may be used in an embodiment of the invention. For simplicity of illustration, one merchant, one issuer, one acquirer, one portable consumer device, one mobile device, and one consumer are shown. It is understood, however, that embodiments of the invention may include multiple merchants, issuers, acquirers, portable consumer devices, mobile devices, and/or consumers. In addition, some embodiments of the invention may include fewer than all of the components shown in FIG. 1. Also, the components in FIG. 1 may communicate via any suitable communication medium (including the Internet), using any suitable communication protocol.

The system 20 includes a merchant 22 and an acquirer 24 associated with the merchant 22. In a typical payment transaction, a consumer 30 may purchase goods or services at the merchant 22 using a portable consumer device 32, such as a credit card. The payment transaction may occur at one or more transaction locations involving merchant 22, portable consumer device 32, and consumer 30. The acquirer 24 can communicate with an issuer 28 via a payment processing network 26, which provides the acquirer 24 with a transaction authorization response. The payment processing network 26 can also communicate with a mobile device 36 via a notification module 27, which provides near real-time transaction notifications.

The acquirer 24 is typically a bank that has a merchant account. The issuer 28 may also be a bank, but could also be a business entity such as a retail store. Some entities are both acquirers and issuers, and embodiments of the invention include such entities. The issuer 28 may operate a server computer 21, which may have a computer readable medium comprising code for performing the functions that the issuer 28 performs. A database 23 comprising account number information and other information may be operatively coupled to the server computer 21.

The consumer 30 may be an individual, or an organization such as a business that is capable of purchasing goods or services. In one embodiment, consumer 30 may be one or more individuals who are authorized to use portable consumer device 32.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular or mobile phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card). In FIG. 1, the portable consumer device 32 and the mobile device 36 are separate devices. However, in another embodiment of the invention, portable consumer device 32 is mobile device 36.

The portable consumer device 32 may comprise a computer readable medium (CRM) 32(a) and a body 32(b). The computer readable medium 32(a) may be on the body 32(b). The body 32(b) may be in the form a plastic substrate, housing, or other structure. The computer readable medium 32(a) may be a memory that stores data and may be in any suitable form. Exemplary computer readable media 32(a) may be in any suitable form including a magnetic stripe, a memory chip, etc. If the portable consumer device 32 is in the form of a card, it may have an embossed region 32(a) which is embossed with a PAN (primary account number).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A "server computer" or "server" is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. In FIG. 1, the access device 34 is located at the merchant 22. However, it could be located at any other suitable location in other embodiments of the invention.

The access devices according to embodiments of the invention may be in any suitable form. Examples of access devices include point of sale (POS) devices, cellular or mobile phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may include a reader 34(a), a processor 34(b) and a computer readable medium 34(c). The reader 34(a) may include any suitable contact or contactless mode of operation. For example, exemplary card readers can include RF (radio frequency) antennas, magnetic stripe readers, etc. to interact with the portable consumer device 32.

System 20 also includes notification module 27 for processing notifications. Notification module 27 may include various subsystems which enroll one or more consumers, such as consumer 30, into a program for receiving transaction notifications and which generate notifications. Notifications also may be generated in payment processing network 26. Notification module 27 is communicatively coupled to payment processing network 26 and an aggregator 37.

Aggregator 37 collects and forwards notifications from notification module 27 to mobile device 36. Aggregator 37 may be an entity or organization that receives and transmits messages to a phone, email account, etc. In some cases, wireless telephone companies may be considered aggregators.

Mobile device 36 refers to any suitable device for receiving notifications and for providing the notifications to consumer 30. Notifications refer to communications of information relating to a transaction to consumer 30 on a display of mobile device 36. As used herein, a notification includes an alert or offer message. An alert message is in the form of textual information about a transaction. An offer message is also in the form of textual information, and is typically based on transactions made by consumer with various merchants.

Notifications may be in any suitable form and may be delivered by any suitable method. Some examples of notifications include a short message service (SMS) message, e.g., a text message, an alert message, an offer message, an instant messaging (IM) message, an email message, or a periodically updated display on a device. An exemplary embodiment of a notification is a near real-time credit card charge. The near real-time credit card charge is a communication that is used to notify consumer 30 of a charge associated with a credit card for a transaction. Another such embodiment of a notification is a notification based on transaction data generated in response to a transaction by consumer 30 conducted with merchant 22.

Mobile device 36 may be in any suitable form. For example, suitable mobile devices 36 can be hand-held and compact so that they can fit into a consumer's wallet and/or pocket (e.g., pocket-sized). Some examples of mobile device 36 include mobile phones, personal digital assistants (PDAs), and the like. In one embodiment of the invention, mobile device 36 is portable consumer device 32.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may swipe a credit card through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 to indicate whether or not the current transaction is authorized. The payment processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34 or the portable consumer device 32, or may be printed out on a receipt.

At the end of the day, a normal clearing and settlement process can be conducted by the payment processing network 26. A clearing process is a process of exchanging financial details between an acquirer and an issuer to facilitate posting to a consumer's account and reconciliation of the consumer's settlement position.

In one embodiment, notification module 27 may be triggered by payment processing network 26 to send a notification upon the detection of a notification event. In some embodiments, the notification module 27 may be embodied by a notification server computer. Payment processing network 26 may monitor and detect the notification event at any time after receiving the authorization request message, such as, for example, upon receiving the authorization request message or upon receiving the authorization response message.

Notification events may have any suitable characteristics. In some cases, a notification message (notification) may be triggered by the initiation or completion of a transaction on an account associated with portable consumer device 32. In another example, notifications are triggered by a transaction, such as a transaction initiated by consumer 30 or other suitable entity. For example, a notification may be triggered by using portable consumer device 32 at access device 34 by consumer 30 or by merchant 22 to conduct a transaction. Other examples of notification events based on transactions include the following: a transaction is over a certain amount of money (e.g. over 5000 USD); any transaction conducted with a particular portable consumer device; a spending threshold (e.g., a daily or monthly spending limit) has been reached for a particular portable consumer device; a transaction is made outside a particular geographic location (e.g., outside the country that the consumer resides in, outside a vicinity of the consumer's present location as determined by a geo-location of a device associated with the consumer, etc.); a risky transaction is being conducted ("risky" may be pre-defined by the consumer and/or the issuer), a transaction is made without the physical portable consumer device (e.g., Internet, mail, or telephone order); a cash transaction or withdrawal; an online account has been accessed to initiate a purchase transaction; a child or spouse has conducted a transaction; a balance on the portable consumer device is exceeded; a particular type of transaction is being conducted (e.g., purchases for airline tickets, lodging, auto rental, restaurants, medical, etc.), etc. Thus, embodiments of the invention are flexible enough to allow for many types of notification events.

Notification module 27 receives trigger information, which may include details of the transaction associated with the notification event and/or details of the notification event. Notification module 27 determines whether consumer 30 should be notified about the notification event, and generates and sends a notification to consumer 30 via aggregator 37 and mobile device 36.

Some of the embodiments described below may use a payment processing system like the one described above, or any suitable combination of components in the payment processing system.

Figure 2:
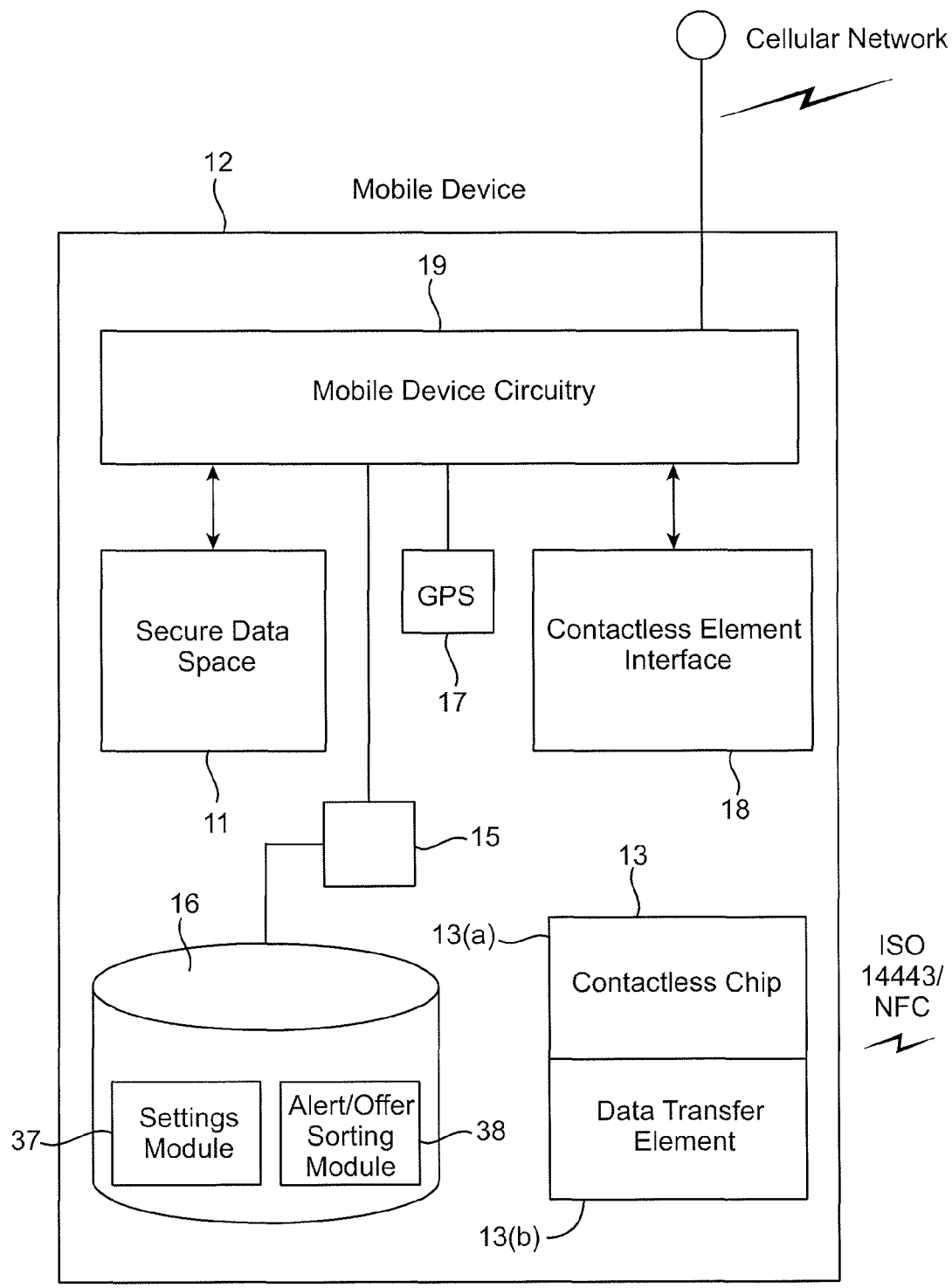
FIG. 2 is a block diagram of an exemplary mobile device according to an embodiment of the invention.

FIG. 2 is a block diagram of an exemplary mobile device 12. In one embodiment, mobile device 36 in FIG. 1 can have the same features as mobile device 12 in FIG. 2. In an alternative embodiment, mobile device 12 can have the same features as portable consumer device 32. Mobile device 12 can be used to receive alert and offer messages, and conduct payment transactions. A mobile device 12 that is capable of conducting payment transactions and receive alerts and offers is shown in FIG. 2.

Mobile device 12 further includes a contactless element 13, typically implemented in the form of a semiconductor chip 13(a) (or other data storage element) with an associated wireless data transfer (e.g., data transmission) element 13(b), such as an antenna. Contactless element 13 is associated with (e.g., embedded within) mobile device 12 and data such as a targeted offer or control instructions transmitted via cellular network may be applied to contactless element 13 by means of contactless element interface 18. Contactless element interface 18 functions to permit the exchange of data and/or control instructions between the mobile device circuitry 19 (and hence the cellular network) and contactless element 13.

Mobile device 12 may also include a secure data space 11, which may be used by the device to store operating parameters and/or other data utilized in operation of the device. The secure data space 11 may be in the form of a chip that is separate and apart from the chip in the contactless element 13, or alternatively, could be a section of memory in the chip that forms part of the contactless element 13. Note that the chip in the contactless element 13 may include data storage capability in the form of a memory that may be accessed via interface 18 to permit the implementation of read, write, and erase functions, for example.

In accordance with still other embodiments, the mobile device may further include a processor 15 and computer readable storage medium 16 for storing code modules and configured to direct the processor to perform various tasks. For example, the computer readable storage medium may comprise a magnetic disk drive or a flash memory chip.

As discussed below, the computer readable storage medium may contain code modules that are configured to cause a processor of the mobile device to receive and recognize a message including a notification. The computer readable storage medium may also contain code modules that cause a processor to receive sorting criteria from a consumer and sort received notifications according to such criteria. For example, settings module 37 may enable consumer 30 to enroll in a service to receive notifications and select criteria that consumer 30 wishes for the notifications to be sorted by. The alert/offer sorting module 38 may cause the processor 15 to receive the sorting criteria from consumer 30, sort the notifications according to criteria from consumer 30, and display the sorted notifications. The computer readable storage medium may also include a code module that is configured to decrypt an encrypted notification including the code that is received by the mobile device. Any of the above modules may be embodied by computer code stored on a computer readable medium, where the computer code is executable by a processor.

Contactless element 13 is capable of transferring and receiving data using a near field communications capability (or near field communications medium) typically in accordance with a standardized protocol or data transfer mechanism (identified as ISO 14443/NFC in the figure). Near field communications capability is a short-range communications capability, such as RFID, Bluetooth™, infra-red, or other data transfer capability that can be used to exchange data between the mobile device 12 and a local apparatus, for example located at a point-of-sale of a merchant or another location at which targeted offers are expected to be redeemed. Thus, mobile device 12 is capable of communicating and transferring data and/or control instructions via both cellular network and near field communications capability.

In accordance with certain embodiments, the mobile device further includes a Global Positioning System (GPS) element 17. GPS element 17 is configured to allow determination of the location of the user at any time. In particular, GPS element 17 relies upon signals from a plurality of orbiting satellites in order to allow the user's location to be determined. Location information obtained from the GPS element 17 may in turn be communicated through the antenna to allow monitoring of the user's position.

Figure 3:
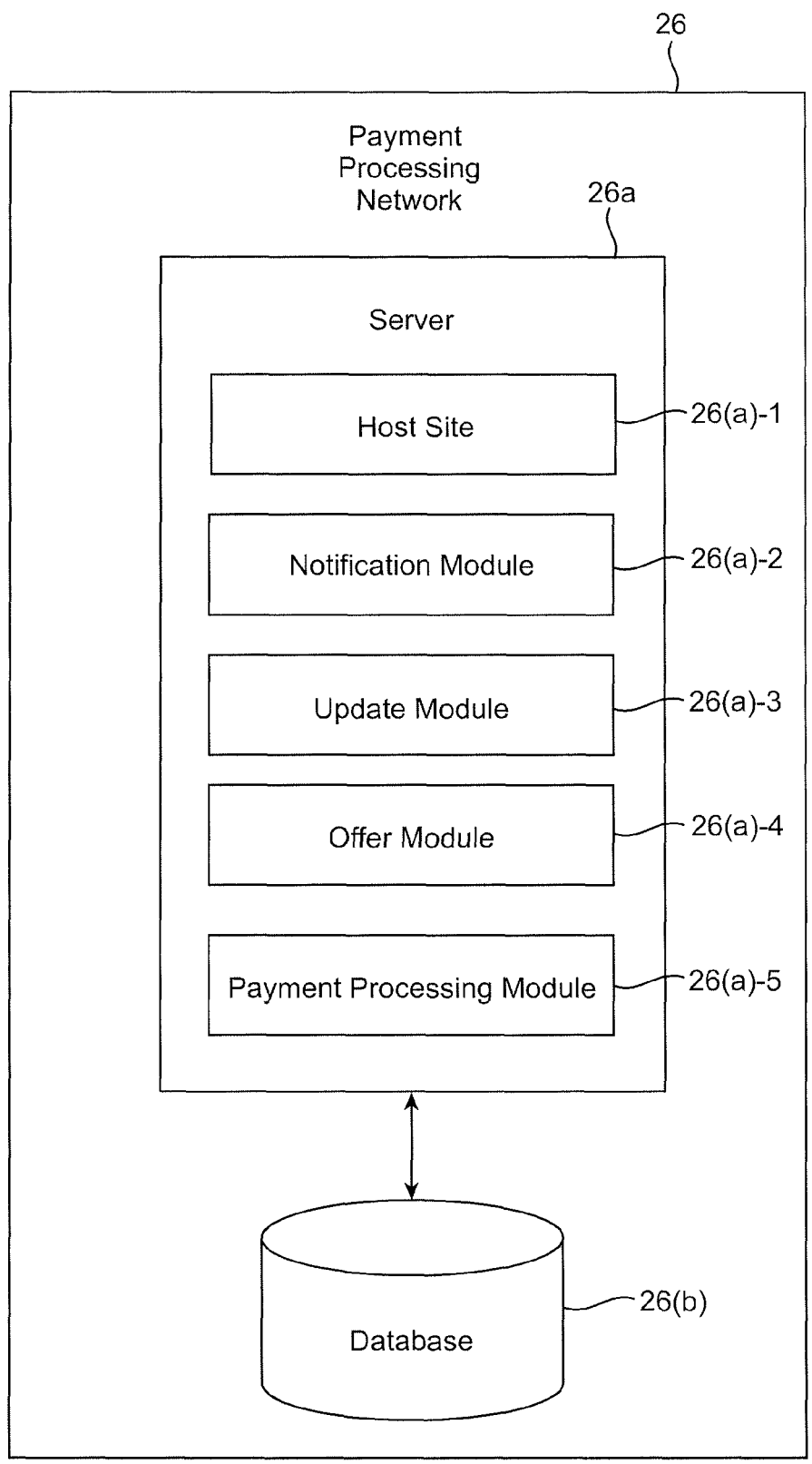
FIG. 3 is a block diagram of a payment processing network according to an embodiment of the invention.

FIG. 3 is a block diagram illustrating some components in a payment processing system network 26 according to an embodiment of the invention. The payment processing network 26 may include a server computer 26(a), and a database 26(b) operatively coupled to the server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The server computer 26(a) in the payment processing network 26 may comprise code modules for triggering and storing a notification message based on a transaction involving consumer 30 on an account associated with portable consumer device 32 or other suitable entity.

The database 26(b) may store any suitable type of information such as transaction criteria that trigger notifications and merchant identifiers.

The server computer 26(a) may also comprise a host site (e.g., a Web site) 26(a)-1, and a number of functional modules. The functional modules may comprise a notification module 26(a)-2, an update module 26(a)-3, an offer module 26(a)-4, and a payment processing module 26(a)-5. Each of these modules may comprise any suitable combination of hardware and/or software to accomplish the functions described herein.

The Web site 26(a)-1 may be used by a consumer 30 to enroll or provide other information needed to facilitate the functions described in this application.

The notification module 26(a)-2 may be configured to send transaction notification messages in the form of SMS messages, e-mails and the like to the mobile device via a telecommunications network or the Internet.

The update module 26(a)-3 may be configured to process updated information from the consumer 30 such as updated transaction thresholds, updated offer preferences, and the like.

The offer module 26(a)-4 is configured to provide offers (e.g., coupons) and store the offers in a database 26(b) until sent or requested. For example, it may provide an offer for a merchant 22. Since multiple merchants can have offers stored in the database 26(*b*), the offers can have common formats or data elements so that they can be easily sorted when they are sent to and received by the mobile device 36. The offer module 26(*a*)-4 may work with the notification module to send the offer to portable consumer device 32 and/or mobile device 36. Alternatively or additionally, it may generate offers independent of any updates provided by the consumer 30. The offers may be stored in the offer module 26(*a*)-4 until sent to (automatically) and/or requested by consumer 30.

In some embodiments, the offer module 26(*a*)-4 may also contain user-defined offer filtering criteria so that only offers of interest to the consumer 30 are sent to the consumer 30. For example, if the consumer 30 only wants to receive offers from specific merchants A, B, and C, then the consumer 30 can specify this using the host site 26(*a*)-1. As a result, only offers from merchants A, B, and C, would be sent to the user's mobile device 36.

In embodiments of the invention, any suitable offer filter criteria may be provided to the server 26(*a*) via the host site 26(*a*)-1. For example, offers may be filtered at the server 26(*a*) by any suitable combination of a specific merchant, a merchant type, a dollar amount, an expiration date, a geographic location, etc.

The payment processing module 26(*a*)-5 may comprise appropriate logic to process electronic payments. For example, the payment processing module 26(*a*)-5 may include an authorization sub-module for receiving and passing authorization request messages to appropriate issuers for approval. It may also include a clearing and settlement sub-module for clearing and settling transactions between different issuers and acquirers.

II. Infrastructure for Sorting Alert and Offer Messages on a Mobile Device

Methods according to embodiments of the invention may be described with reference to FIGS. 1-13. Although specific sequences of steps are described, it is understood that embodiments of the invention are not limited to the order of the specific steps described, and that any suitable combination of steps may be included in embodiments of the invention.

Figure 4:
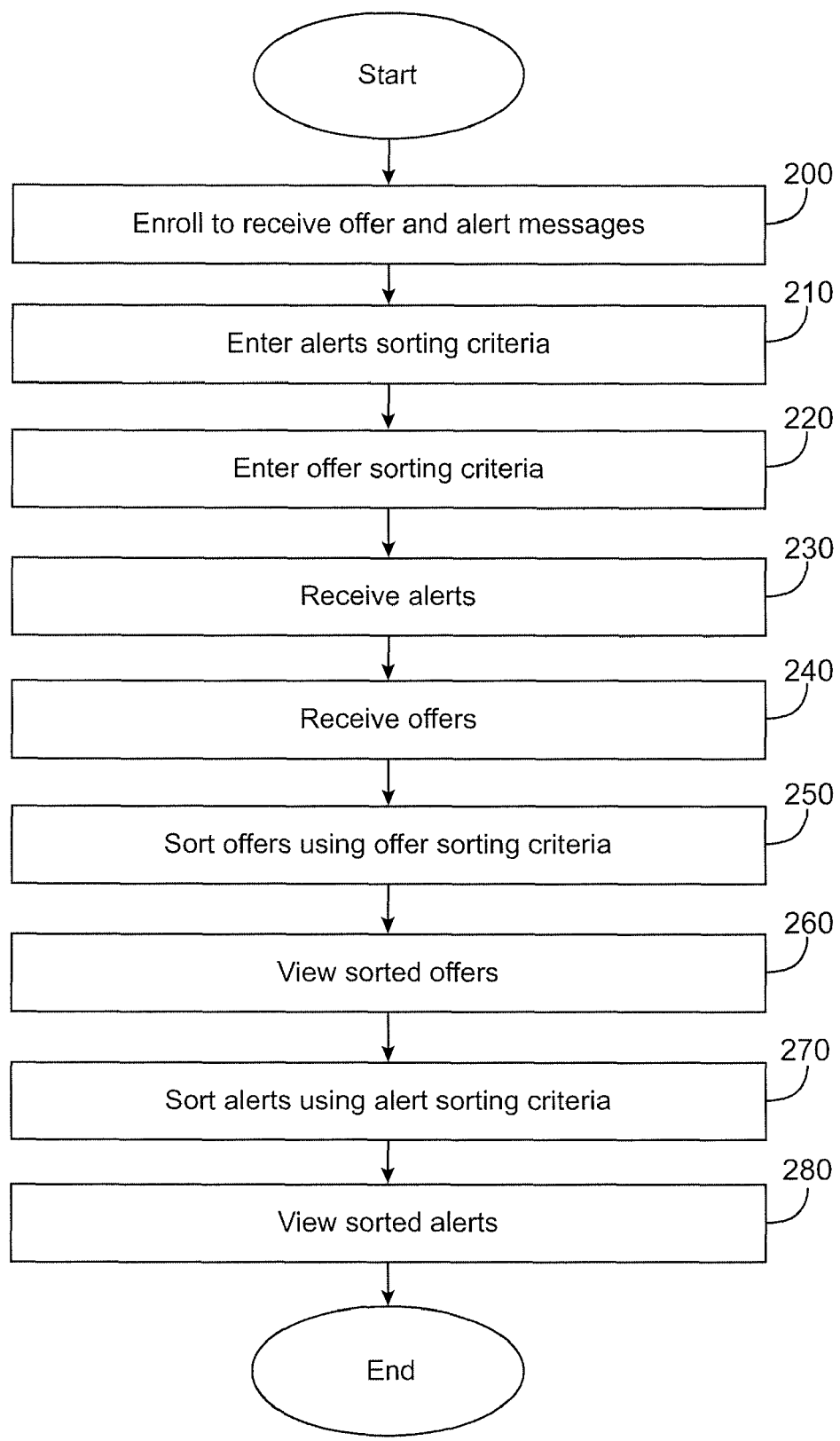
FIG. 4 is a flowchart illustrating steps in a method according to an embodiment of the invention.

FIG. 4 is a flowchart illustrating steps in a method according to an embodiment of the invention. In step 200, the consumer 30 may enroll in a service to receive alert and offer messages (notifications). Consumer 30 may enroll to receive alert and offer messages or update existing messages for transactions made with portable consumer device 32 in any number of ways. For example, consumer 30 can register via a separate website designed for this purpose, via an application on portable consumer device 32 or mobile device 36, or manually through a paper form (which may be considered a registration interface). Issuer 28 or payment processing network 26 may also enroll consumer 30 automatically for alert and offer messages.

Consumer 30 may be required to enter various types of information upon enrollment (which may be edited at any time) such as his name, mobile phone number, personal access number, billing address (including country), user name, password, (pre-defined) password security question, merchant category preferences, specific merchant preferences, geographic location preferences, and geographic location defaults. Consumer 30 may be required to enter his password twice when setting the password and may have the option of changing the password at a later time. This password may be masked visually when entered. Consumer's 30 information may be validated by the website or application managing the notifications and synchronized in near-real time. Consumer 30 may have the option to un-enroll and re-enroll in the service to receive alert and offer messages but may have to wait a certain time period after enrollment to do so. Multiple consumers desiring to receive alert and offer messages on the same mobile device 36 may be required to enter different user names, but may share the same personal access number. Consumer 30 may be shown a list of issuers upon enrollment and may be immediately sent offers.

Enrollment information may include details of notification events that describe the conditions that must take place to trigger notifications and other account information. Upon enrollment to receive notifications, consumer 30 may have the option of selecting which types of transactions will trigger notifications that he will receive. In regards to enrollment to receive offer messages, consumer 30 may select upon enrollment from user preferences such as types of merchants to receive offers from, geographic preference for receiving offers (based on city and/or one or more zip codes), number of offers received (by merchant per day or week), number of offers stored in mobile device 36, status of offer (active or expired), choice to receive an alert flag when new offers are received by mobile device 36, and the option to receive an alert when offers are set to expire within a configurable amount of time (1 day, 1 week, etc.). Further, consumer 30 may be able to select from a master list of all participating merchants and the enrollment service may provide a filtered list of the merchants (with the option of displaying inactive merchants). In alternative embodiments, the notification events are predetermined by the system, for example, such that consumer 30 can enroll by opting into the notification program with minimal input. The enrollment data entered by consumer 30 may be available for later reporting to multiple groups such as merchants and issuers participating in the service, and various service administrators. Further, the service administrator or issuer 28 may send consumer 30 information such as upgrades/downgrades regarding options that consumer 30 may have chosen.

Enrollment information is typically received, for example, via a web interface using a computer, or from issuer 28 and may be stored in a database. Enrollment information may be provided to a system which will be detecting the notification event so that the system knows what events to monitor before a notification is sent to consumer 30. The enrollment information may be provided on demand (e.g., when consumer 30 makes a change), periodically (e.g., hourly, daily, etc.), or an individual request basis, and using a push or pull scheme. In one embodiment, the system detecting the notification event is payment processing network 26. In another embodiment, the system detecting the notification event is issuer 28.

Referring to FIG. 4, in steps 210 and 220, consumer 30 may enter alert and offer sorting criteria. Before entering alert and offer sorting criteria, consumer 30 may have the option of viewing unsorted alerts and offers. In a typical transaction, consumer 30 may use portable consumer device 32 to make a purchase via a payment processing network 26. For example, consumer 30 may use a portable consumer device, such as a credit card, to pay 5000 USD for a flat screen television. Consumer 30 may receive a notification of the transaction on mobile device 36. When consumer 30 wishes to sort the alert messages (or offer messages) by a certain criteria, consumer 30 may do so by entering sorting criteria as shown in steps 210 and 220 on mobile device 36.

The sorting criteria may be entered into the mobile device 36 before or after alert and offer messages are received by the mobile device 36. In the former case, alert messages and/or offer messages may be sorted automatically upon receipt of such messages, thus making it easier for the consumer 30.

The sorting criteria of step 210 may include sorting by transaction type, transaction amount, issuer, type of card, and the date the alert messages were received on the mobile device. General payment transaction alerts may be configurable by a transaction threshold amount defined by consumer 30. Further, the general payment transaction alert threshold may be configurable by currency type. Mail-order telephone-order and cross-border transaction alerts, as well, may be configurable by a transaction threshold amount defined by consumer 30.

It is desirable to sort alert messages by transaction type, transaction amount, issuer, type of card, and the date the alert messages were received on the mobile device. Sorting by transaction type is desirable, in case the consumer 30 wants to know how much he is spending in particular spending categories such as gas, food, and travel. Sorting by issuer is also desirable. In some cases, the consumer 30 may have multiple payment cards, or multiple payment instances or applications from multiple issuers residing on a single mobile device. The consumer 30 may wish to know how much is being spent using the various accounts associated with the cards, instances, or applications associated with the different issuers, because the consumer 30 may have different rewards or other benefits associated with the different cards, instances, or applications. This advantage can also be present when sorting by type of card. Lastly, sorting by date (e.g., when a transaction is conducted) is also desirable. For example, in some cases, alerts may be received at times that are different from when transactions are actually conducted (e.g., due to delays in the system). In such cases, sorting can be done by transaction date so that the user knows his purchase history according to time.

Note that any of the above sorting criteria may be combined in any suitable manner in embodiments of the invention. For example, the consumer 30 may sort by issuer first, and then may sort by merchant, and then by dollar amount, in some instances. Thus, multiple levels of sorting can occur in embodiments of the invention.

The sorting criteria of step 220 may include sorting by a date the offer messages were received, a date the offer messages expire, the merchant, the offer messages which are still active, the offer messages which have expired, and the offer messages which have been redeemed.

Figure 5:
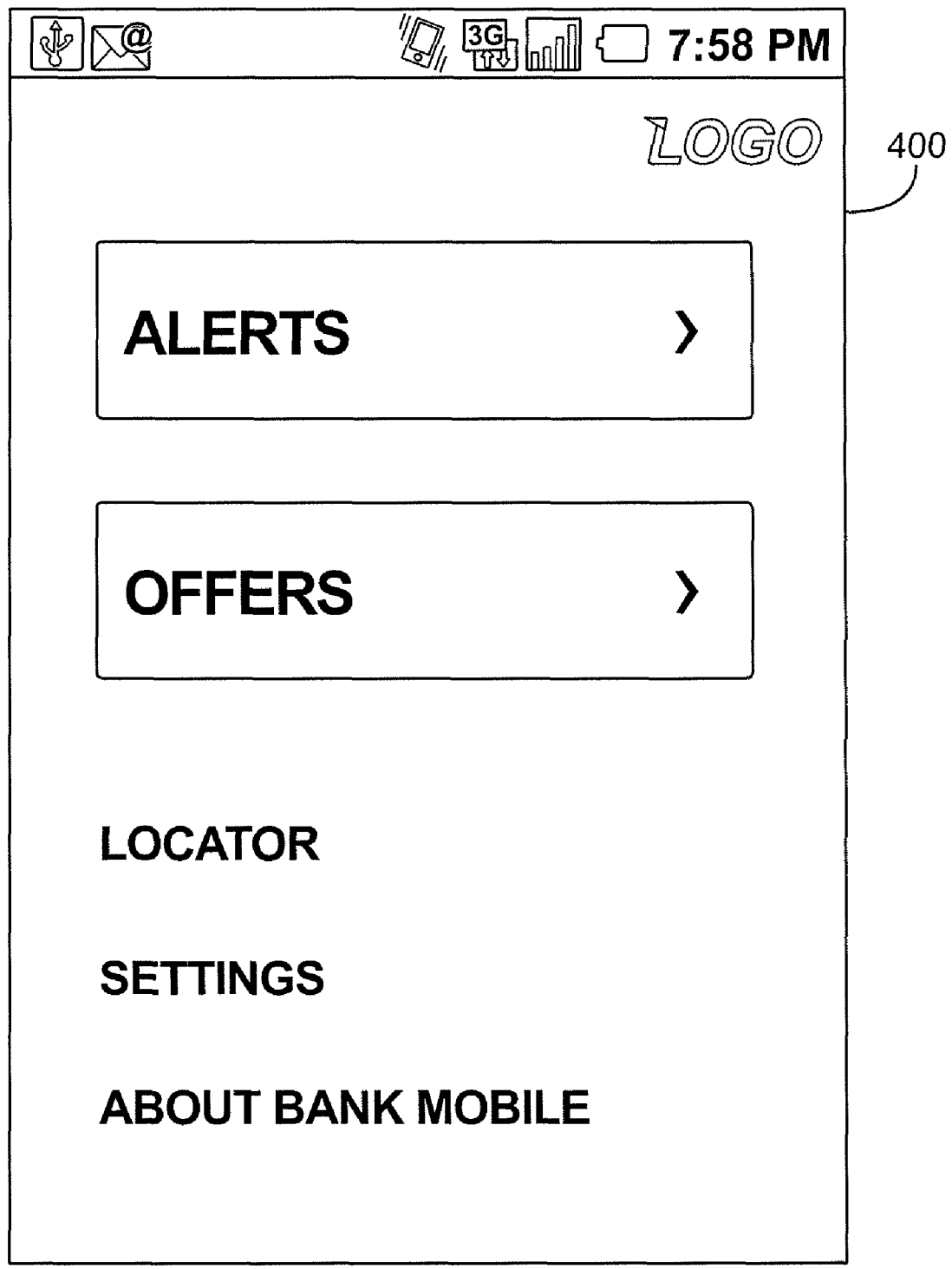
FIG. 5 shows a screen shot on a mobile phone display for viewing alert or offer messages according to an embodiment of the invention.
Figure 6:
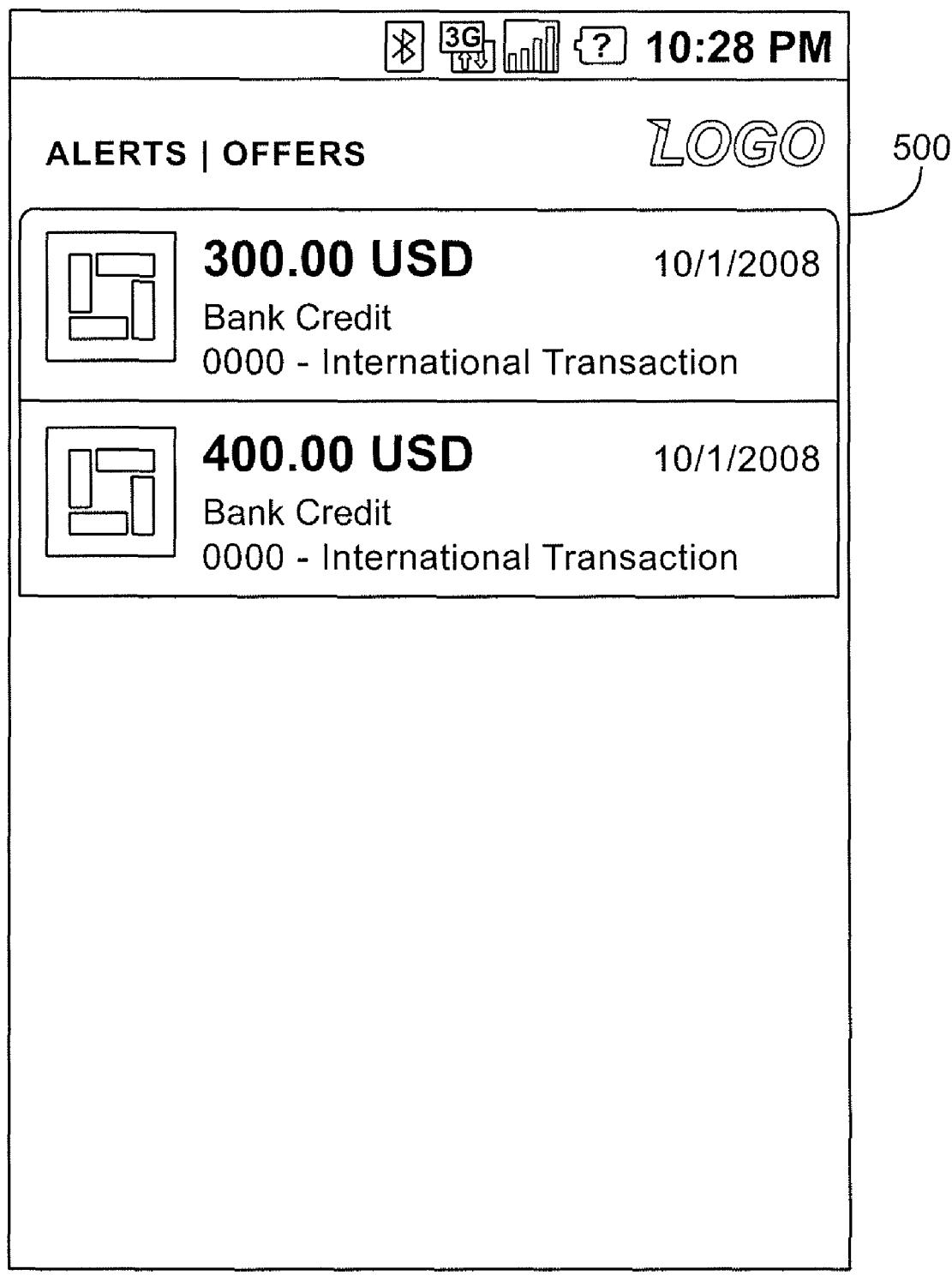
FIGS. 6-7 show screen shots on a mobile phone display illustrating alert messages according to an embodiment of the invention.
Figure 7:
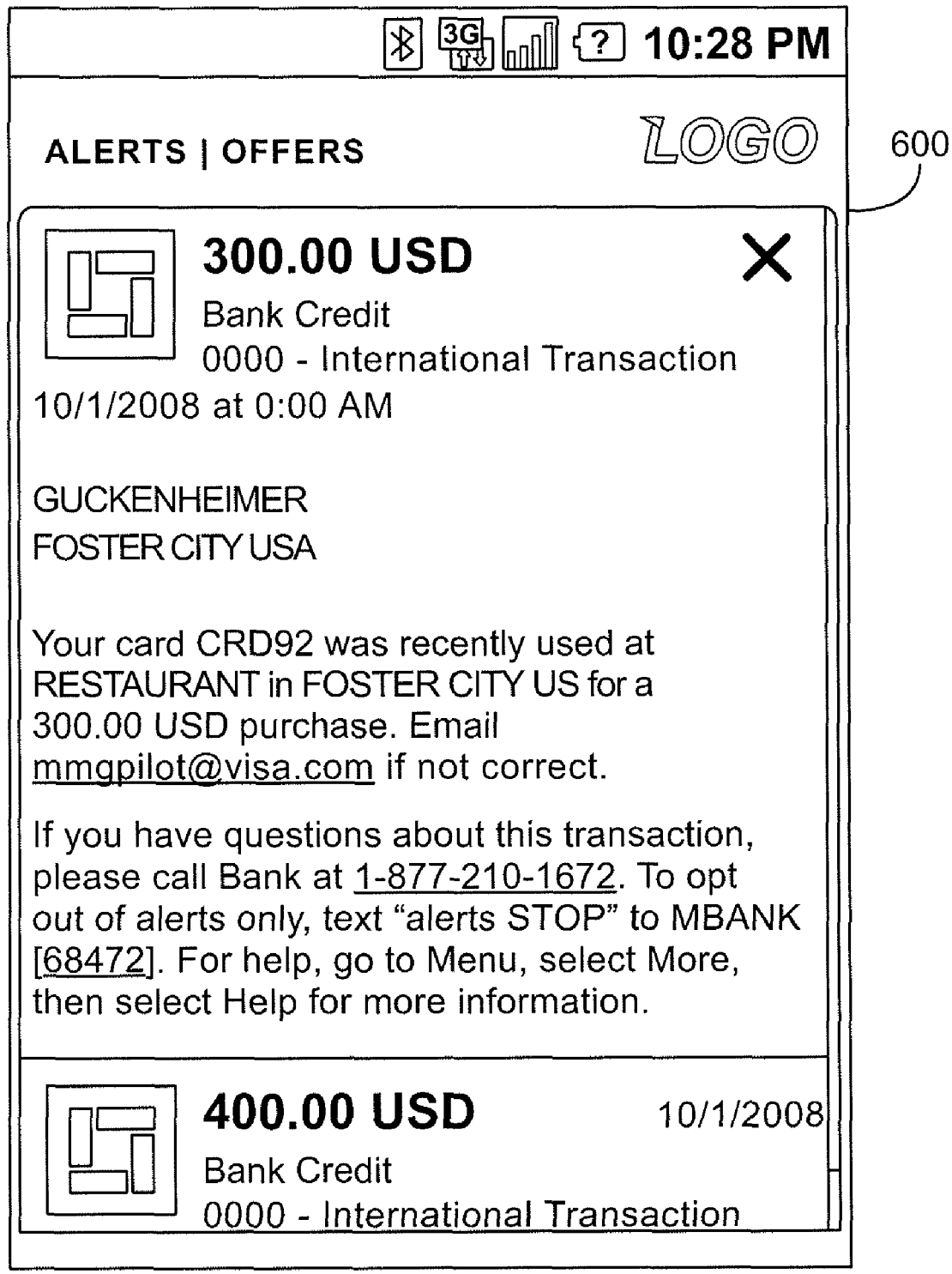
Figure 8:
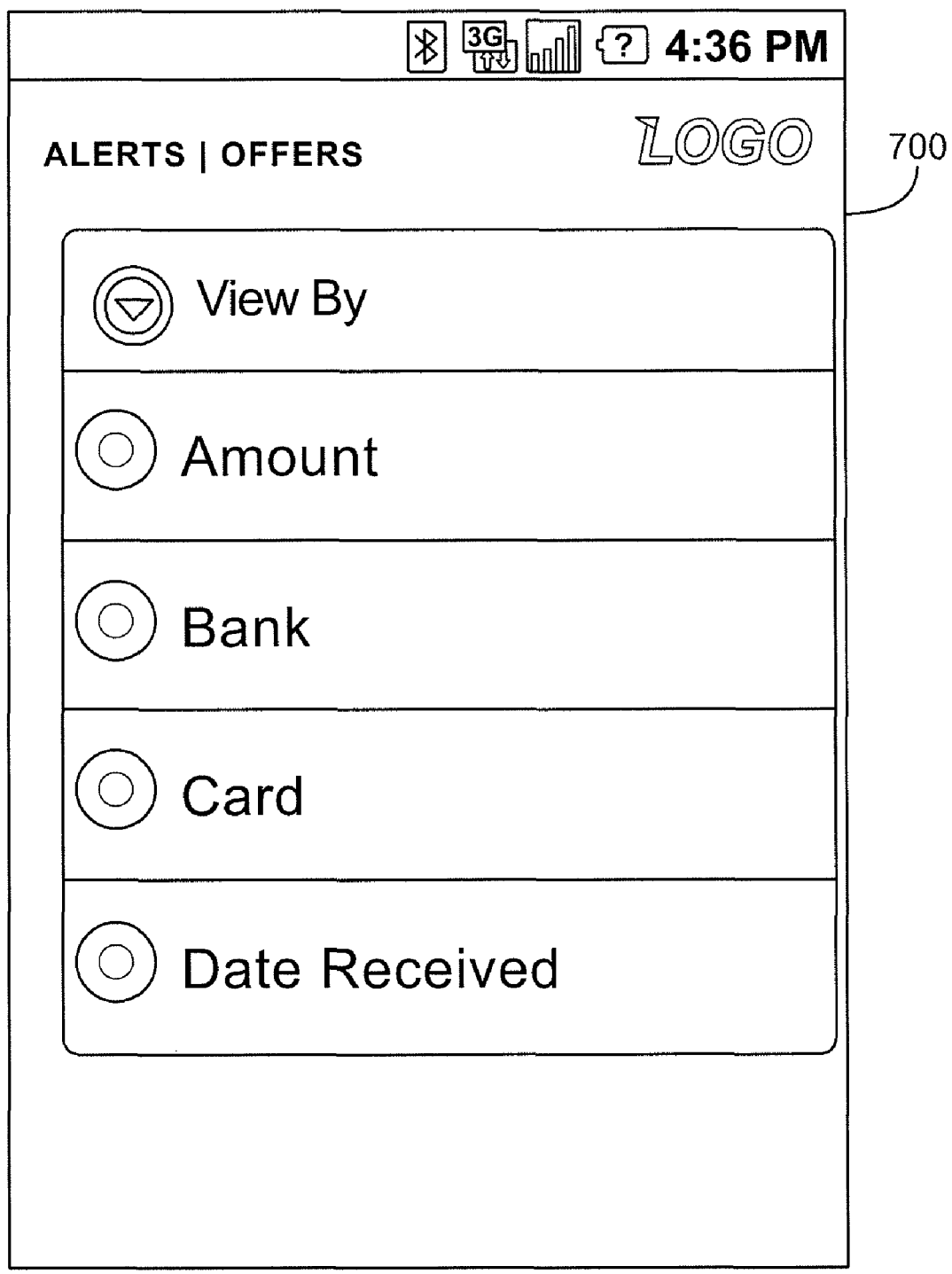
FIGS. 8-9 show screen shots on a mobile phone display for sorting alert messages according to an embodiment of the invention.

In steps 230 and 240, alert and offer messages are received by mobile device 36. Consumer 30 is typically able to access these alert and offer messages by selecting either option (indicator) on the graphical user interface of mobile device display 400 as shown in FIG. 5, which shows a screen shot on mobile device display 400 for viewing alerts or offers. For example, if consumer 30 selects the "alerts" option (indicator) on mobile device display 400, various alert messages may appear, as displayed in mobile device display 500 shown in FIG. 6, which shows a screen shot on mobile device display 500 illustrating alerts. The visual depiction of certain messages may reflect certain events (such as offers set to expire). Consumer 30 may have the option of selecting an alert message displayed on mobile device display 500 to view more detailed information regarding the alert. Mobile device display 600 of FIG. 7, which is another screen shot on a mobile device display illustrating alert messages, shows a detailed alert.

As mentioned above, consumer 30 is typically able to access alert and offer messages by selecting either option on the graphical user interface of mobile device display 400 as shown in FIG. 5. According to an embodiment of the invention, full alert and offer messages may not be viewable by consumer 30 unless selecting either option (indicator) on mobile device display 400. Alert and offer flags (condensed alert messages), however, containing high level information that an alert has been triggered and which type of alert has been triggered, may be viewable by the mobile device 36 even if consumer 30 has not activated the application for viewing alert or offer messages as shown in FIG. 5. The alert flag may be sent as a SMS message and stored in mobile device's 36 SMS inbox or the like and may be received by mobile device 36 even though graphical user interface of mobile device display 400 is not open. The alert flag (and full alert and offer messages for that matter) may not disrupt any activity by consumer 30 or any other application that is running on mobile device 36 and may be deleted by consumer 30.

Consumer 30 may opt to receive a visual display or audio signal on mobile device 36 when alert or offer messages (or flags) are received. For example, consumer 30 may receive audio warnings associated with receipt of the messages such as a single "beep" or "chime", a "swoosh" sound, or a single "oink" (like a pig) through an audio device (e.g., a speaker) in the mobile device, and may be able to select particular events that may trigger such warnings. Consumer 30 may be able to set the audio at "silence" and/or "vibrate".

Mobile device 36 may only have a certain capacity in terms of storing alert and offer messages. Mobile device 36 may inform consumer 30 when any part of the memory threshold has been met and consumer 30 may be informed that new alert or offer messages may not be received unless consumer 30 deletes some alert or offer messages on mobile device 36. In an alternative embodiment, mobile device 36 may continue to receive messages even when the threshold is met by deleting the oldest messages first to make space for the new ones. When alert or offer messages cannot be sent to the mobile device 36 due to data storage information, the messages may be cached and forwarded once there is sufficient data storage. As mentioned above, consumer 30 may set a limit on the total number of alert or offer messages that he may receive.

In another embodiment of the invention, the alert and offer messages may not immediately appear after selecting such option on mobile device display 400. Consumer 30 may be directed to another page first, before the alert and offer messages are displayed. For example, upon selecting "offers" on mobile device display 400, consumer 30 may be directed to a page that shows the various merchants participating in the offers program, as shown on mobile device display 900 in FIG. 10. This may occur if user has not yet enrolled in the service to receive alert and offer messages or has not entered relevant card information.

Figure 13:
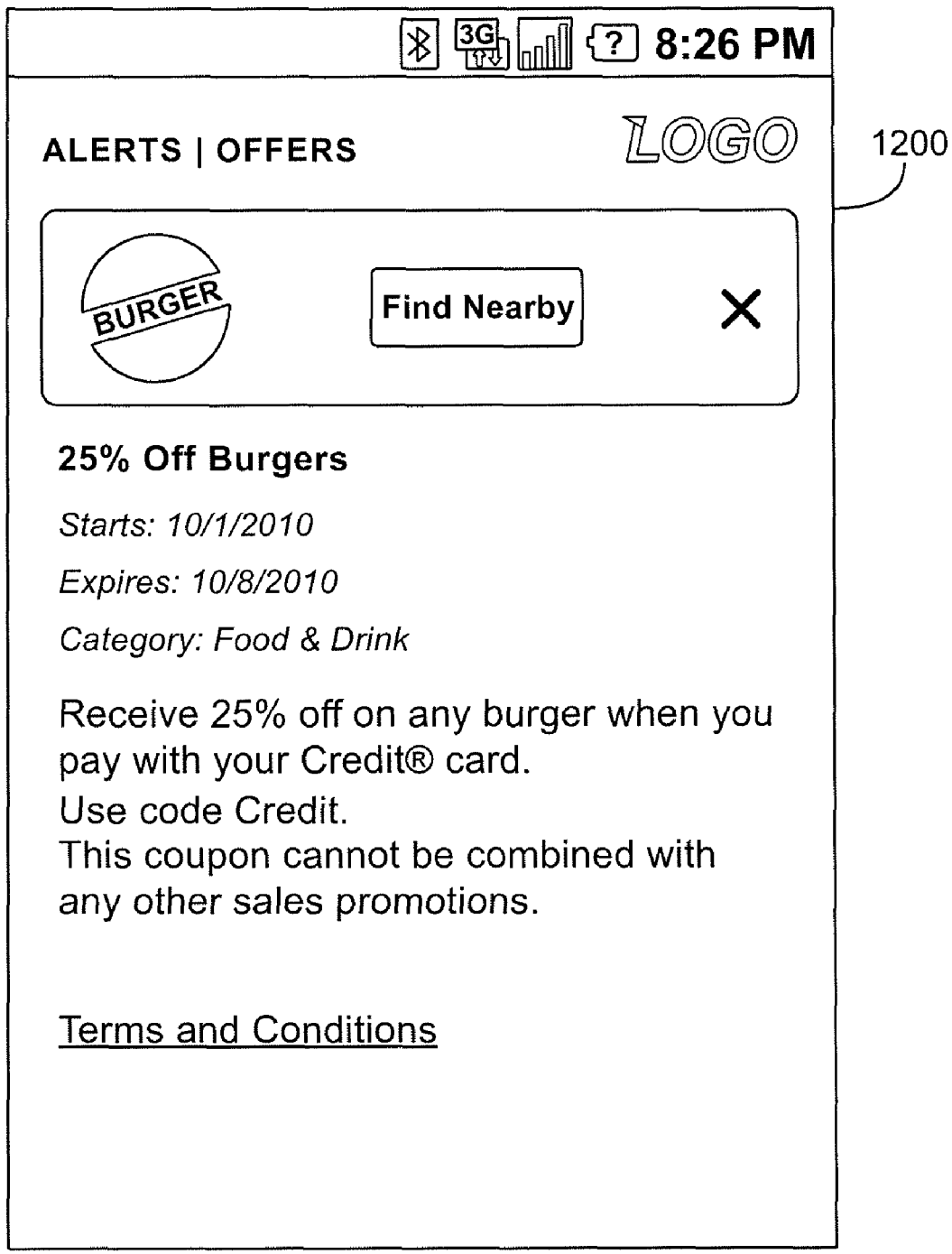

In another embodiment of the invention, the offers are initially stored in offer module 26(a)-4. An example of an offer is shown in FIG. 13, which shows a screen shot on mobile device display 1200 illustrating an offer. The offers include various information such as merchant name and location (if available), merchant logo, a date the offer was received, a date the offer will become active, a date the offer will expire, the type of offer (e.g., food/drink, apparel, books, computers, entertainment), qualification status, information regarding offer details, and terms and conditions associated with the offer. Further, the offer messages may include a link to a locator map that displays locations associated with the specific offer when applicable, a link to a URL for the offer when applicable, and an option to forward the offer via a SMS ("tell a friend"). An alert message indicating that consumer 30 has conducted a qualified transaction to receive an offer may be sent to consumer 30 conveying such information.

Consumer 30 may select various other actions to be performed on an alert or offer message after receiving the message. Actions to be performed on a message may include one or more of the following: set fraud risk, disable card, dispute transaction, provide more information about the message, claim a transaction, send a message to a group about the message, forward the message, launch a browser or the like upon selecting/touching the message, and redeem via alphanumeric code or bar code.

Figure 9:
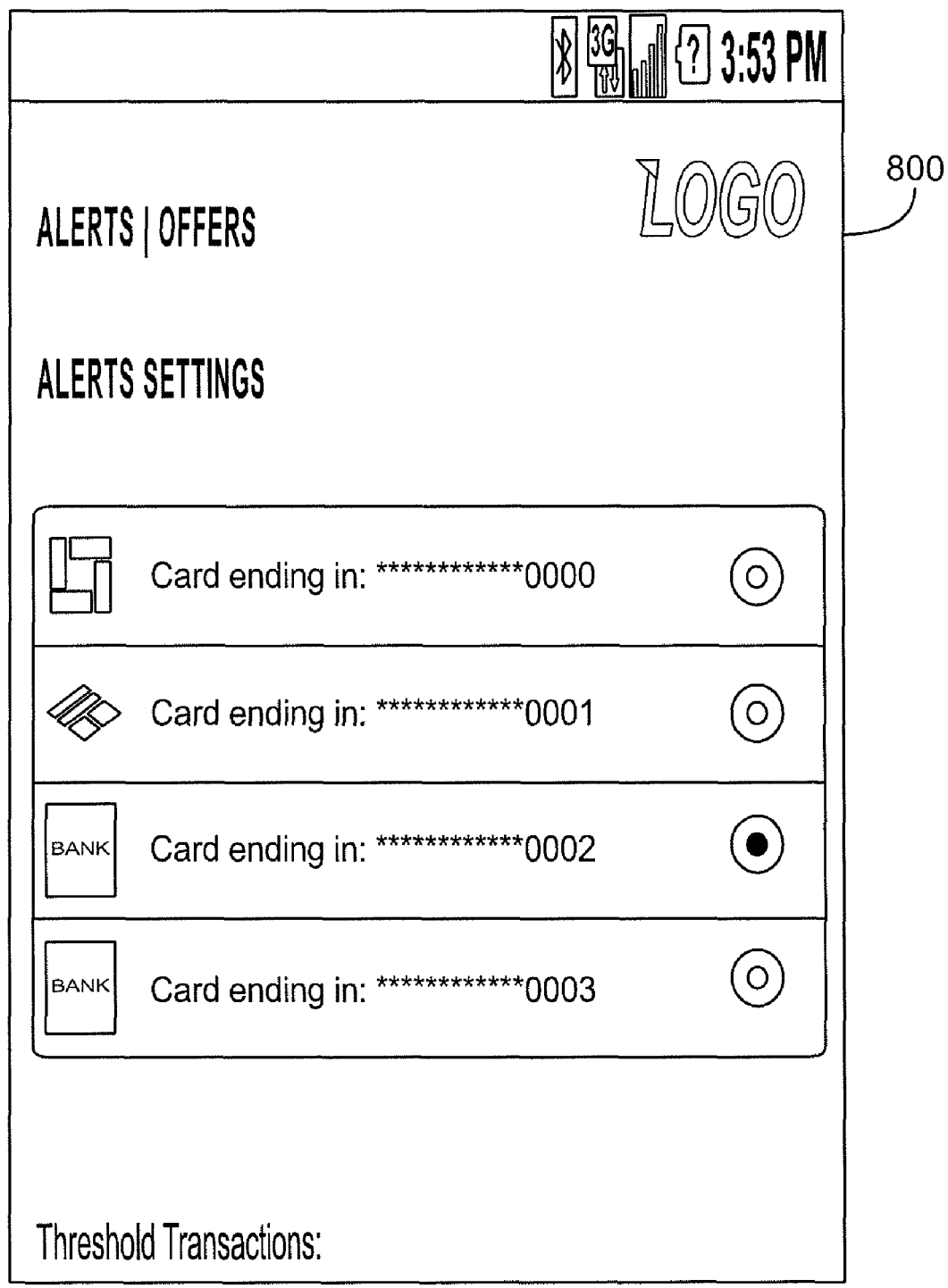
Figure 10:
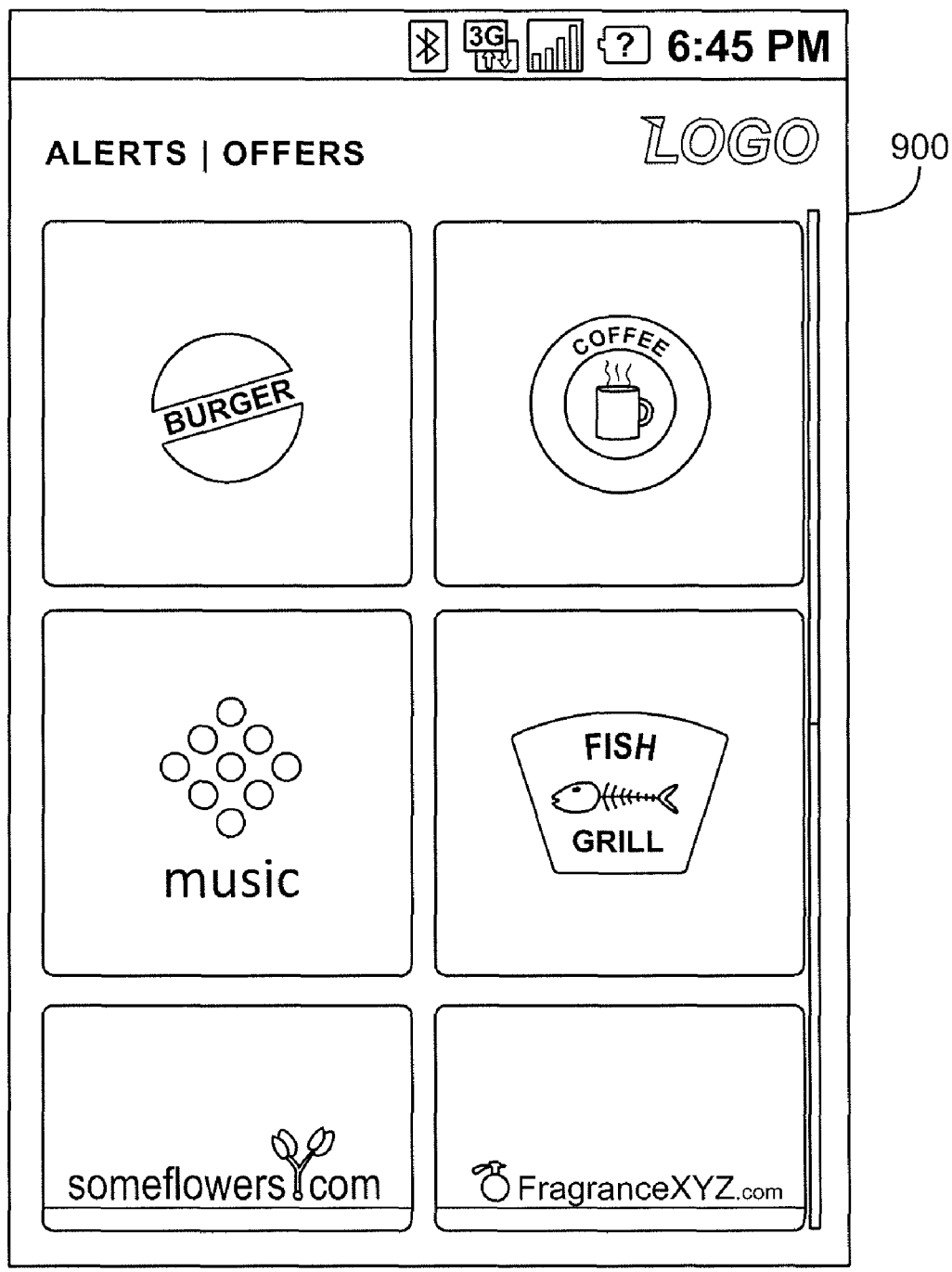
FIG. 10 shows a screen shot on a mobile phone display for viewing offer messages according to an embodiment of the invention.

Referring to FIG. 4, after they are received, the offers and alerts can be automatically sorted using the previously entered sorting criteria and can be viewed by consumer 30. In steps 250 and 270, the alert and offer messages may be sorted according to user criteria via alert/sorting module 38 or the like. The alert and offer messages may be sorted by the various criteria mentioned above. In regards to alert messages, consumer 30 may be prompted to select from various criteria as shown in mobile device display 700 in FIG. 8, which shows a screen shot on mobile device display 700 for sorting alerts. If consumer 30, for example, wishes to sort alert messages by card, the consumer may be prompted to select a card as shown in FIG. 9, which shows another screen shot on mobile device display 800 for sorting alerts. Consumer 30 may select from various cards that have been enrolled in the service and the alert messages will be sorted according this criteria.

Figure 11:
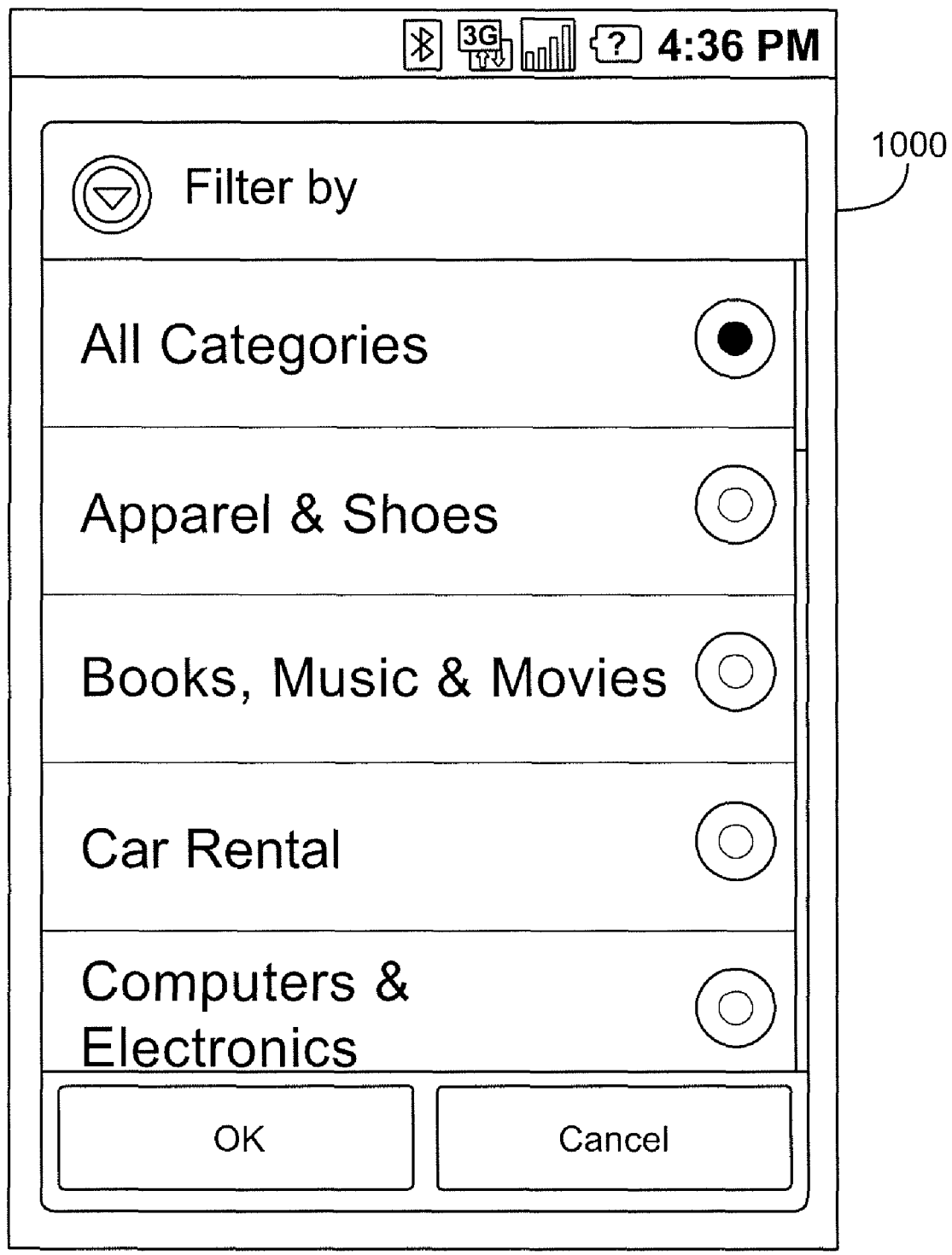
FIG. 11 shows a screen shot on a mobile phone display for sorting offer messages according to an embodiment of the invention.
Figure 12:
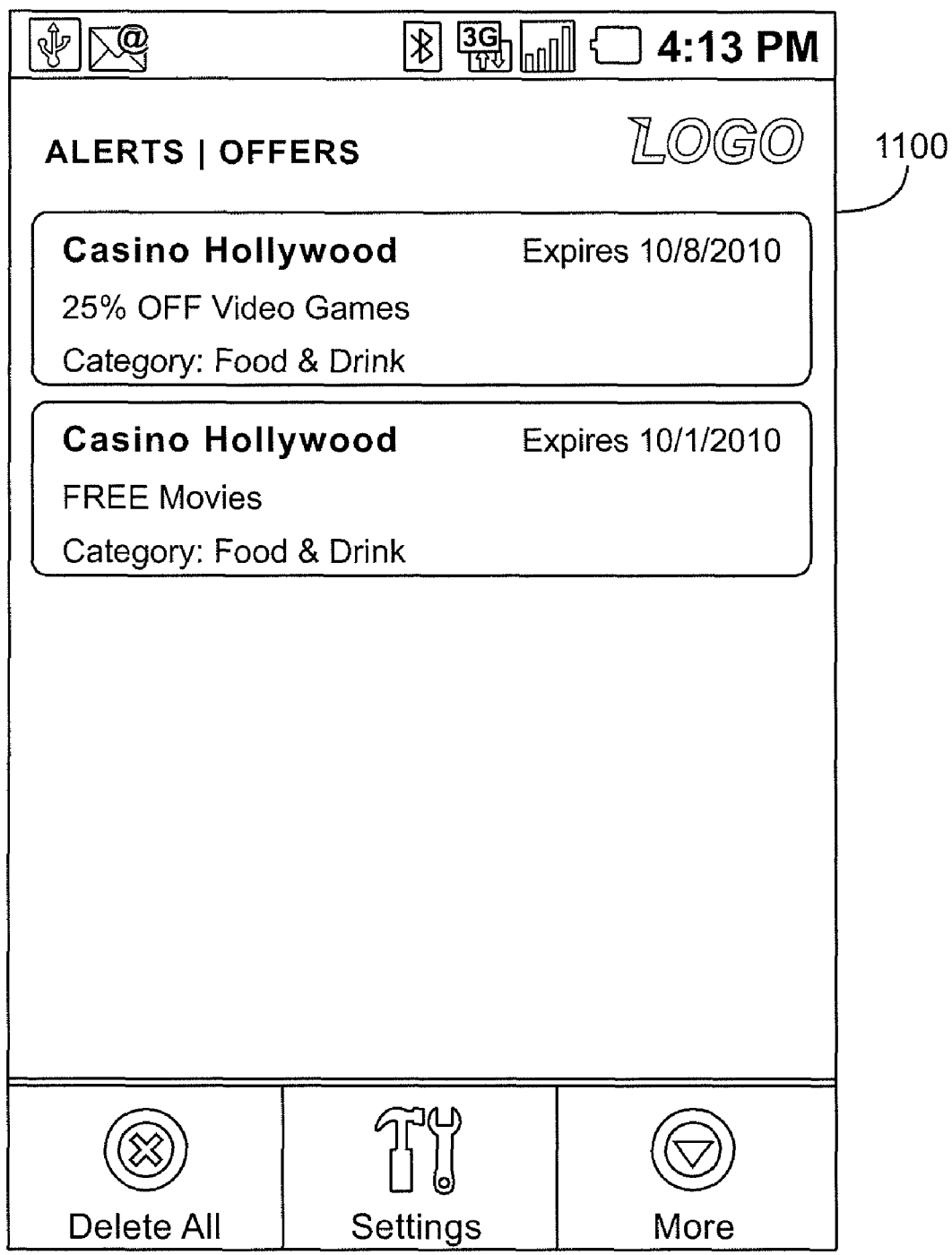
FIGS. 12-13 show screen shots on a mobile phone display illustrating offer messages according to an embodiment of the invention.

In regards to offer messages, consumer 30 may be prompted to select from various criteria to sort offer messages by as shown in mobile device display 1000 in FIG. 11, which shows a screen shot on mobile device display 1000 for sorting offer messages. The consumer 30 may, for example, opt to sort offer messages by merchant. After consumer 30 selects the appropriate criteria, a list of offer messages sorted by merchant (or in this case one particular merchant) may be displayed as shown in FIG. 12, which shows a screen shot on mobile device display 1100 illustrating offer messages according to an embodiment of the invention. Consumer 30 may select an offer message as shown in FIG. 12 to launch a more detailed offer message as shown in FIG. 13.

It is desirable to sort offers by criteria such as merchant, offer type, offer value, and geographic location, as this helps the consumer locate offers more quickly. For example, if the consumer is at a shopping center in downtown Los Angeles and is interested in buying high end shoes, the sorting criteria can sort the offers so that only offers for high end shoes by merchants in downtown Los Angeles are displayed.

In steps 260 and 280, the sorted alert and offer messages are displayed on a display in the mobile device 36 and are viewed by the consumer 30. As mentioned above, the sorted alert and offer messages may be displayed on mobile device displays in any suitable form. For example, they may be displayed on mobile phones, personal digital assistants (PDAs), and the like. Consumer 30 may select one or more received messages and an action may be applied to the selected messages.

Figure 14:
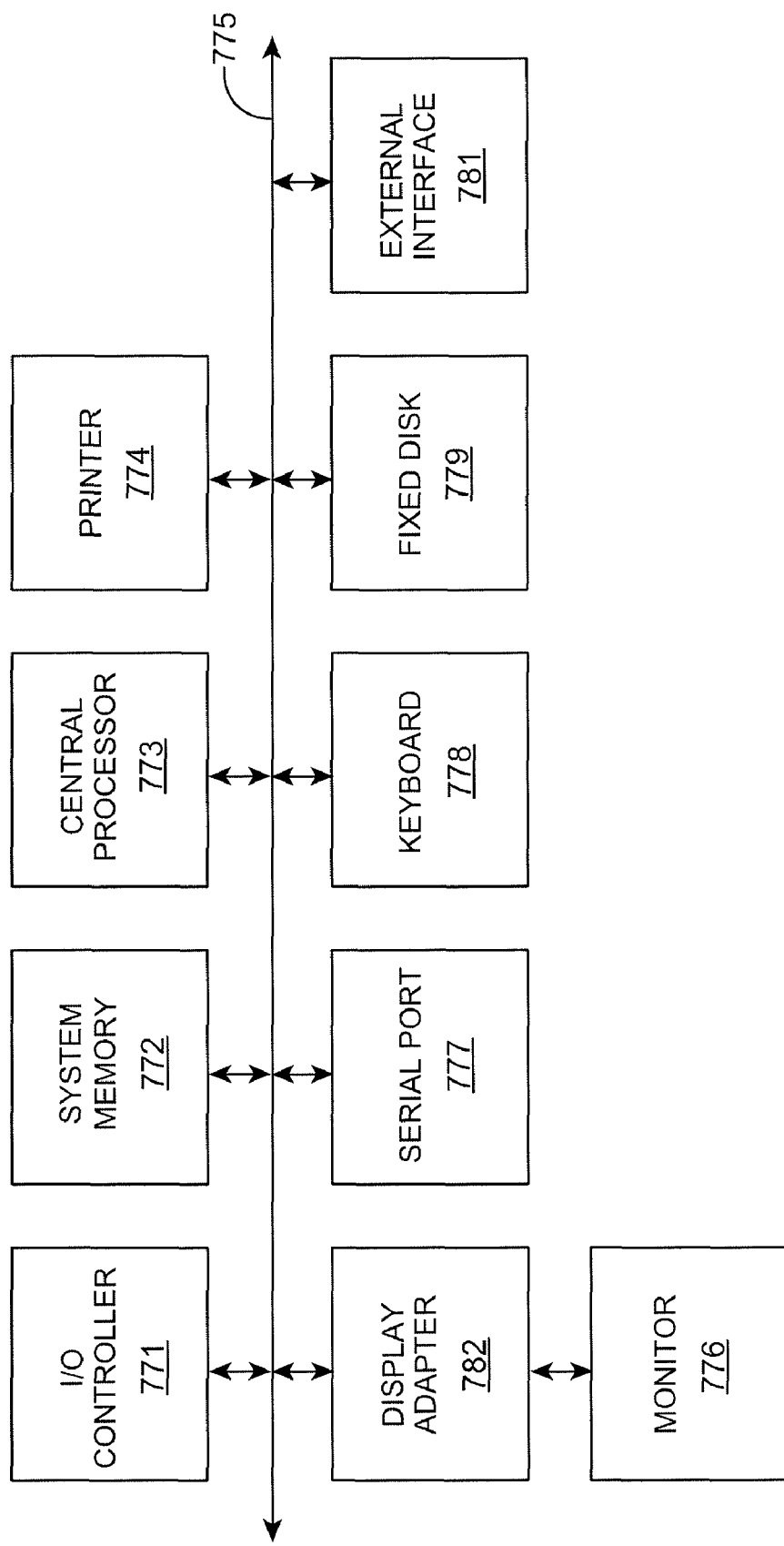
FIG. 14 shows components in a computer apparatus.

FIG. 14 shows subsystems or components that can be present in a computer apparatus. The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 14. The subsystems shown in FIG. 14 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention have a number of advantages. As noted above, offers and alerts can be filtered and/or sorted on a mobile device display, so that they are more easily managed by a user. In some cases, providing a mobile device with the ability to sort alerts makes it less likely that the consumer will forget to use an offer and/or will quickly find an offer that is relevant to his current situation or geographic location. Embodiments of the invention also make it more likely that the consumer will be able to keep transaction alert messages for later record keeping.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A mobile device comprising:
 a processor;
 a display coupled to the processor; and
 a computer readable medium coupled to the processor, wherein the processor is configured to execute a set of instructions stored on the storage medium to enable the processor to implement a method comprising:
  receiving alert message sorting criteria and offer sorting criteria from a user associated with the mobile device, the alert message sorting criteria comprising one or more of: a transaction amount, an issuer, and a type of card;
receiving alert messages wherein each alert message includes transaction data associated with a transaction conducted with a merchant;
receiving offer messages wherein each offer message includes offer data;
sorting the alert messages according to the received alert sorting criteria;
sorting the offer messages according to the received offer sorting criteria; and
displaying the sorted alert messages and offer messages using the display.

2. The mobile device of claim 1, wherein the transaction data comprises one or more of: a transaction amount, a transaction type, a transaction date, a location, a city, a state, a currency code, a merchant, an issuer, and a type of card.

3. The mobile device of claim 1, wherein the offer sorting criteria comprises one or more of: a date the offer messages were received, a date the offer messages expire, the merchant, the offer messages which are still active, the offer messages which have expired, and the offer messages which have been redeemed.

4. The mobile device of claim 1, wherein the mobile device is a mobile phone.

5. A method comprising:
receiving alert message sorting criteria and offer sorting criteria from a user associated with a mobile device, the alert message sorting criteria comprising one or more of: a transaction amount, an issuer, and a type of card;
receiving alert messages at the mobile device wherein each alert message includes transaction data associated with a transaction conducted with a merchant;
receiving offer messages wherein each offer message includes offer data;
sorting, using a processor coupled with a storage medium, the alert messages according to the received alert sorting criteria;
sorting the offer messages according to the received offer sorting criteria; and
displaying the sorted alert messages and sorted offer messages on a display of the mobile device.

6. The method of claim 5, wherein the transaction data comprises one or more of: a transaction amount, a transaction type, a transaction date, a location, a city, a state, a currency code, a merchant, an issuer, and a type of card.

7. The method of claim 5 further comprising:
providing offer filter criteria to an offer module on a server computer, wherein the offer module selects the offer messages and thereafter sends the offer messages to the mobile device.

8. The method of claim 5, wherein the offer sorting criteria comprises one or more of: a date the offer messages were received, a date the offer messages expire, the merchant, the offer messages which are still active, the offer messages which have expired, and the offer messages which have been redeemed.

9. The method of claim 5, wherein the mobile device is a mobile phone.

10. The method of claim 9 wherein the mobile phone comprises a processor, a computer readable medium operatively coupled to the processor, a contactless element configured to transmit to and receive data from an access device using near field communications operatively coupled to the processor, and an antenna operatively coupled to the processor.

11. The method of claim 5 wherein the alert messages are in the form of short message service (SMS) messages.

12. The method of claim 5 further comprising:
receiving a selection of an action to be performed on the alert message.

13. The method of claim 12 wherein the action comprises disabling a payment card.

14. The mobile device of claim 1, wherein the sorting is performed automatically upon receipt of the alert messages.

15. The method of claim 5, wherein the sorting is performed automatically upon the receiving of the alert messages.

16. A method comprising:
receiving a user-selected limit on a total number of alert messages that can be received on a mobile device;
receiving user-selected offer sorting criteria;
receiving alert messages at the mobile device wherein each alert message includes transaction data associated with a transaction conducted with a merchant;
receiving offer messages wherein each offer message includes offer data;
deleting alert messages on the mobile device based on the user-selected limit;
sorting, using a processor coupled with a storage medium, alert messages on the mobile device based on alert message sorting criteria comprising one or more of: a transaction amount, an issuer, and a type of card;
sorting the offer messages according to the received offer sorting criteria; and
displaying the sorted alert messages and offer messages on a display of the mobile device.

17. The method of claim 16, wherein the transaction data comprises one or more of: a transaction amount, a transaction type, a transaction date, a location, a city, a state, a currency code, a merchant, an issuer, and a type of card.

18. The method of claim 5 wherein the alert messages are in the form of short message service (SMS) messages.

* * * * *